(12) United States Patent
Jowett

(10) Patent No.: US 6,749,745 B2
(45) Date of Patent: Jun. 15, 2004

(54) IN-PIPE WASTEWATER TREATMENT SYSTEM

(76) Inventor: E. Craig Jowett, 177 Cobblestone Pl. Box 385, Rockwood, Ontario (CA), N0B 2K0

( * ) Notice: Subject to any disclaimer, the term of this patent is extended or adjusted under 35 U.S.C. 154(b) by 0 days.

(21) Appl. No.: 10/077,846

(22) Filed: Feb. 20, 2002

(65) Prior Publication Data

US 2002/0134717 A1 Sep. 26, 2002

(30) Foreign Application Priority Data

Feb. 26, 2001 (GB) .............................. 0104693
Oct. 22, 2001 (GB) .............................. 0125266

(51) Int. Cl.$^7$ .................................. C02F 3/00
(52) U.S. Cl. .................. 210/150; 210/170; 210/532.2; 210/615
(58) Field of Search ................ 210/150, 151, 210/170, 253, 255, 299, 532.2, 615, 617, 747

(56) References Cited

U.S. PATENT DOCUMENTS

| | | | |
|---|---|---|---|
| 1,638,869 A | * | 8/1927 | Mosi .................. 210/532.2 |
| 1,660,697 A | * | 2/1928 | Webb .................. 210/532.2 |
| 1,832,967 A | | 11/1931 | Craig |
| 3,407,608 A | | 10/1968 | Whitehead |
| 3,826,742 A | * | 7/1974 | Kirk et al. .................. 210/150 |
| 4,039,437 A | * | 8/1977 | Smith et al. .................. 210/150 |
| 4,218,318 A | * | 8/1980 | Niimi et al. .................. 210/150 |
| 4,721,408 A | | 1/1988 | Hewlett |
| 5,083,885 A | | 1/1992 | Ushitora et al. |
| 5,160,039 A | * | 11/1992 | Colburn .................. 210/150 |
| 5,322,387 A | | 6/1994 | Heine et al. |
| 5,344,557 A | * | 9/1994 | Scanzillo .................. 210/170 |
| 5,510,032 A | | 4/1996 | Vail et al. |
| 5,810,509 A | | 9/1998 | Nahlik, Jr. |
| 5,823,711 A | | 10/1998 | Herd et al. |
| 5,895,569 A | | 4/1999 | Connelly |
| 5,980,739 A | | 11/1999 | Jowett et al. |
| 6,153,094 A | | 11/2000 | Jowett et al. |
| 6,325,923 B1 | * | 12/2001 | Zaluski .................. 210/150 |
| 6,383,372 B1 | | 5/2002 | Houck et al. |
| 6,440,304 B2 | | 8/2002 | Houck et al. |
| 6,482,319 B2 | | 11/2002 | Houck et al. |

FOREIGN PATENT DOCUMENTS

EP  0 741 111  11/1996

* cited by examiner

Primary Examiner—Christopher Upton
(74) Attorney, Agent, or Firm—Anthony Asquith & Co.

(57) ABSTRACT

In place of the conventional aerobic treatment station, wastewater undergoes aeration in a treatment-pipe. The treatment-pipe has a long/narrow configuration. Open-cell foam serves as treatment material, in the treatment pipe, and promotes attachment of microbial colonies. Two or more treatment-pipes may be connected in series or parallel. Also, in place of a conventional septic tank, wastewater undergoes anaerobic treatment and settlement in a treatment-pipe. The treatment-pipe has a long/narrow configuration. End chambers provide inlet and outlet ports, a sump for collecting settled-out solids, and sealing attachments for the treatment-pipe itself.

66 Claims, 10 Drawing Sheets

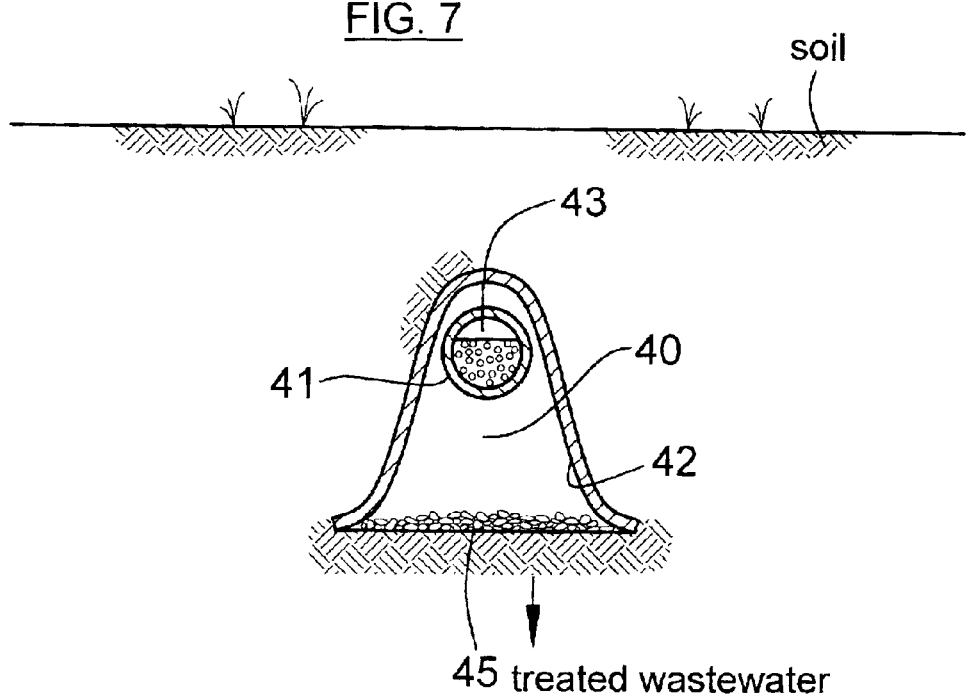
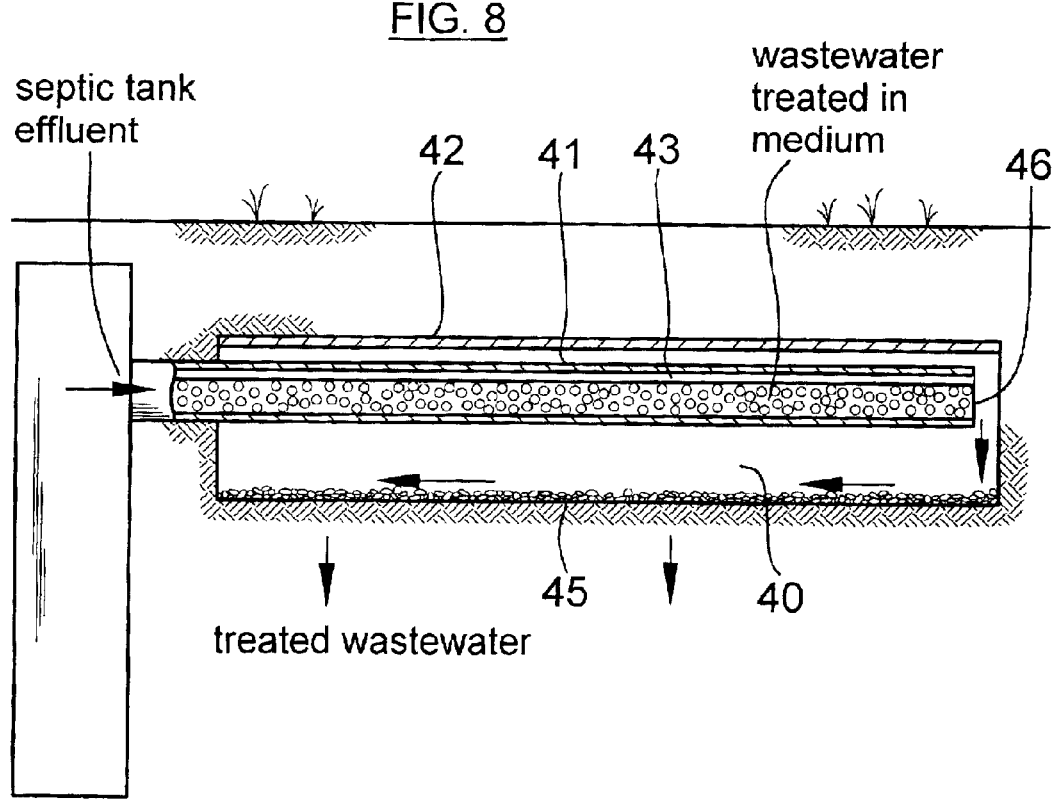

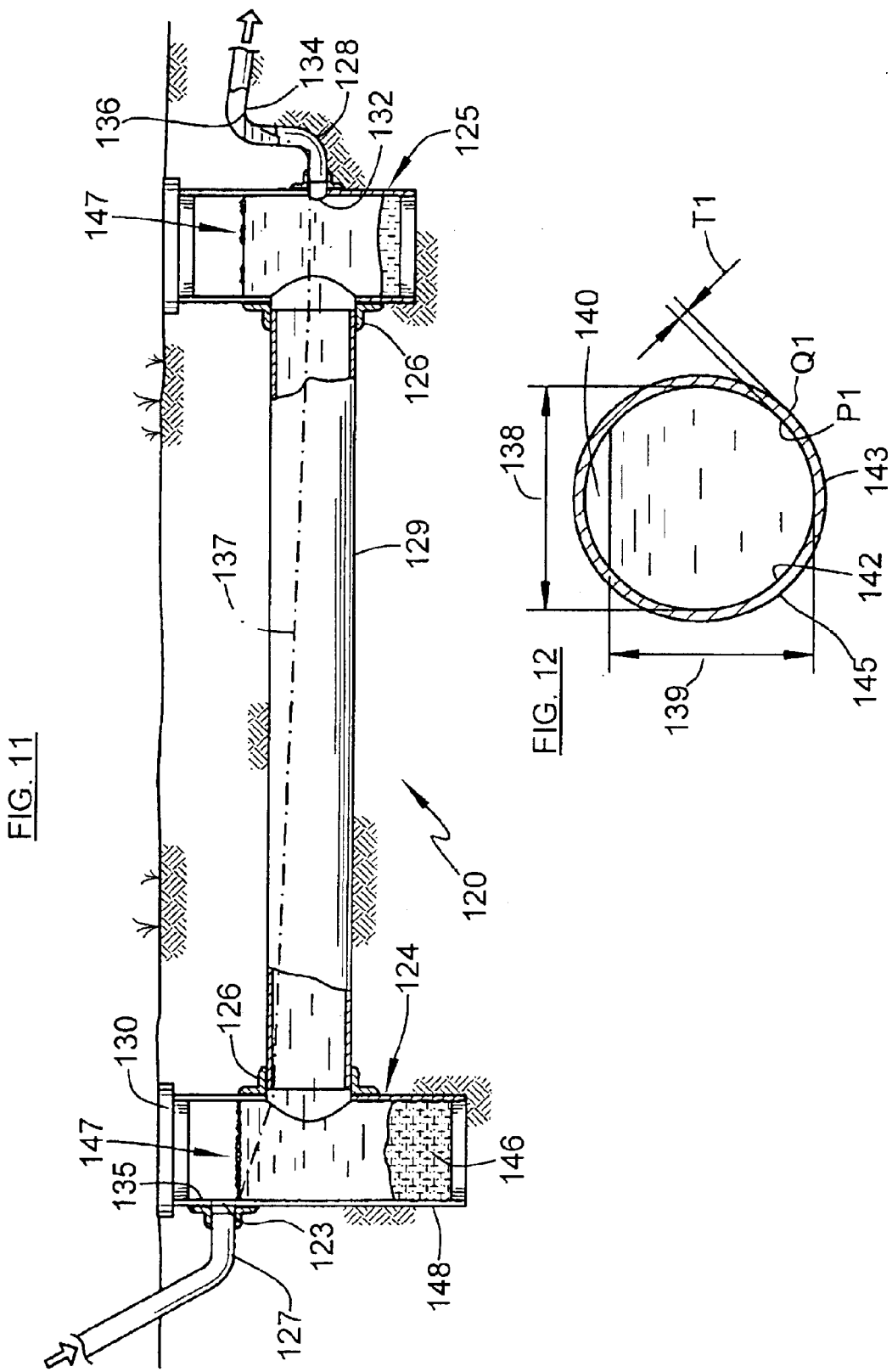

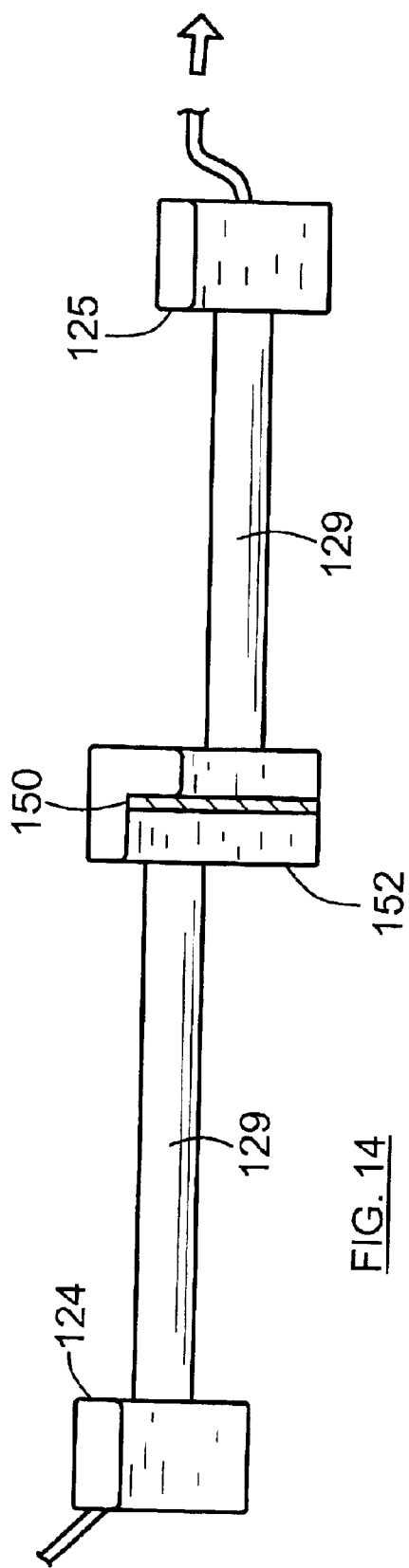
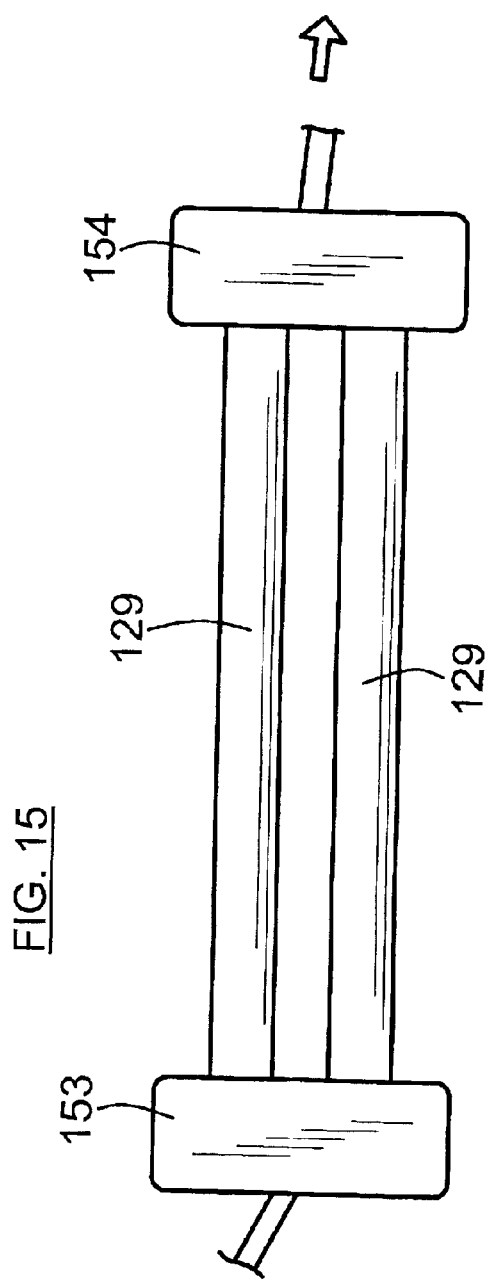
FIG. 14
FIG. 15

IN-PIPE WASTEWATER TREATMENT SYSTEM

In a first aspect, this invention relates to typically aerobic, microbial treatment of mainly domestic sewage and other wastewaters, and to the renovation of polluted water in general.

THE FIRST ASPECT OF THE INVENTION, IN RELATION TO THE PRIOR ART

One common arrangement for treating wastewater has the following elements or stations: (a) an anaerobic digester station; (b) an aeration station; and (c) an infiltration station. In that case, the first aspect of the invention may preferably be utilised in the aeration station.

Water entering an aeration station may be water that has just emerged from a septic tank. Here, solid materials in the wastewater can settle out, and reductive breakdown reactions can take place, which break down much of the organic content of the wastewater, both solid and dissolved. Dissolved ammonium in the water is largely not affected by passage through the septic tank. Water emerging from a well-engineered septic tank has only a small undissolved (i.e solid) organic content. One of the functions of the aeration station is to remove the remaining dissolved organic content.

In the aeration station, the oxidation reactions can take place. In passing through a well-engineered aeration station, the carbonaceous-BOD content is oxidised to inconsequential liquids and gases. Also, ammonium in the water can be oxidised in an aeration station.

The infiltration station mainly serves the mechanical purpose of infiltrating the water into the ground, rather than serving to promote treatment reactions. An infiltration station is well engineered if water infiltrates into the ground without disruption to the ground and without clogging, etc, over a long service life.

In traditional septic-tank wastewater treatment systems, the aeration station and the infiltration station have been combined in a single structure, comprising a tile-bed soakaway. The first aspect of the present invention relates to treatment systems in which the aeration station is a separate structure from the infiltration station, and follows generally from the technologies disclosed in the following U.S. Pat. Nos. 5,707,513 5,762,784 5,980,739 5,997,747 6,063,268 6,156,094.

In its first aspect, the present invention is aimed mainly at providing a new form of treatment station in which the water is presented most efficaciously to a body of treatment material. One aim is to improve the efficiency of utilisation of premium space. The invention, in its first aspect, may be utilised generally for removing contaminants from water, but the advantages of the invention are very marked in the case of the aerobic treatment station, to vigorously promote the carbonaceous-BOD oxidation reactions, and this first aspect of the invention is described mainly as it relates to an aeration station. It is intended that an aeration station, in this new form, should require no more input of ingredients or energy, and no more attention or service, than is required in traditional conventional septic tank systems. (It should be understood, in this context, that conventional septic treatment systems sometimes include electric pumps and other active components, and septic systems commonly need to be serviced every year or two.)

In the first preferred aspect of the invention, the aeration station has a long, narrow configuration. So much so, that it preferably becomes convenient to fit the aeration station into a pipe. In a preferred arrangement, which will be described, the aeration station is located in a pipe that transfers water from the effluent port of the septic tank to the ground-infiltration station. Unlike conventional tile-beds, the aeration stations as described herein are generally not suitable for serving double duty as ground-infiltration stations. It is mainly in the smaller size of aeration station, that the long/narrow configuration can provide large gains in efficiency, for example in single-dwelling domestic installations, or an installation for handling, say, six dwellings, or a small institutional installation, such as a restaurant or golf course. The advantages of the invention are not so marked in the case of e.g municipal-sized treatment facilities.

Hitherto, it has not been practical to configure a water treatment station to fit in a pipe. It has not previously been proposed how the constraints associated with flow through a pipe might be overcome. Treatment reactions require vigorous colonies of microbes, and it may be considered impractical to house the colonies of microbes actually in the pipe. It has been considered that a pipe is for moving water, not for treating water.

DETAILED DESCRIPTION OF PREFERRED EMBODIMENTS OF FIRST ASPECT

By way of further explanation of the first aspect of the invention, exemplary embodiments of the invention will now be described with reference, to the accompanying drawings, in which.

Figure 5A:
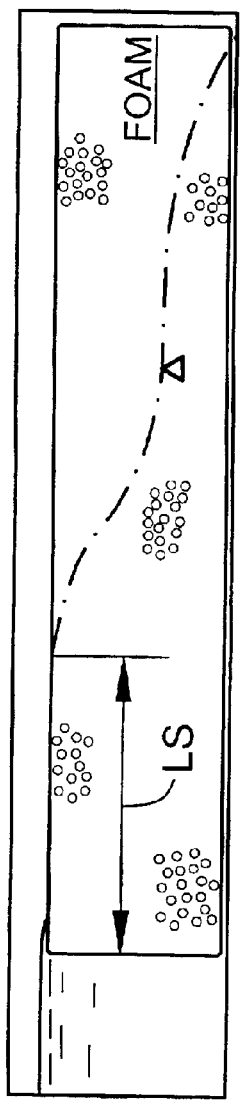
FIG. 5a is a diagrammatic cross-sectioned view of a pipe containing a body of treatment material.
Figure 5B:
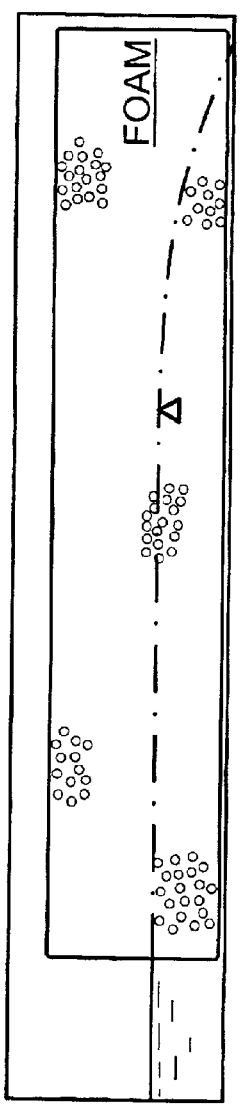
FIG. 5b is the same, view as FIG. 5a, but shows a different condition.
Figure 6A:
Figure 6B:

FIGS. 6a,6b correspond to FIGS. 5a,5b, but show a different treatment material.

FIG. 7 is an end view of another system for treating wastewater that embodies the invention.

FIG. 8 is a cross-sectioned side-view of the system of FIG. 7.

Figure 9:
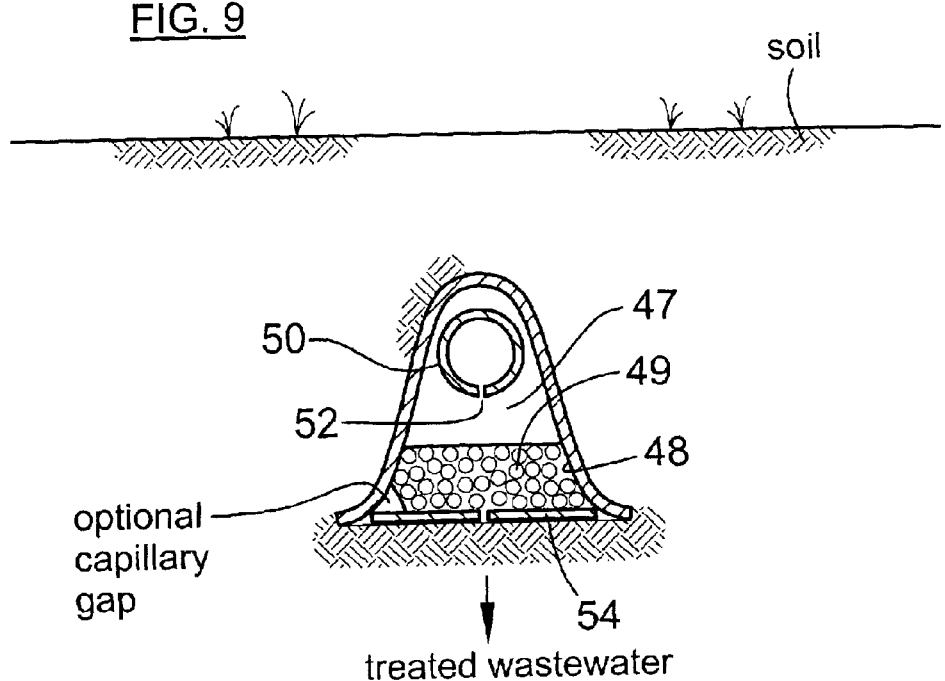

FIG. 9 is an end view, like FIG. 7 of another system that embodies the invent ion.

Figure 9A:
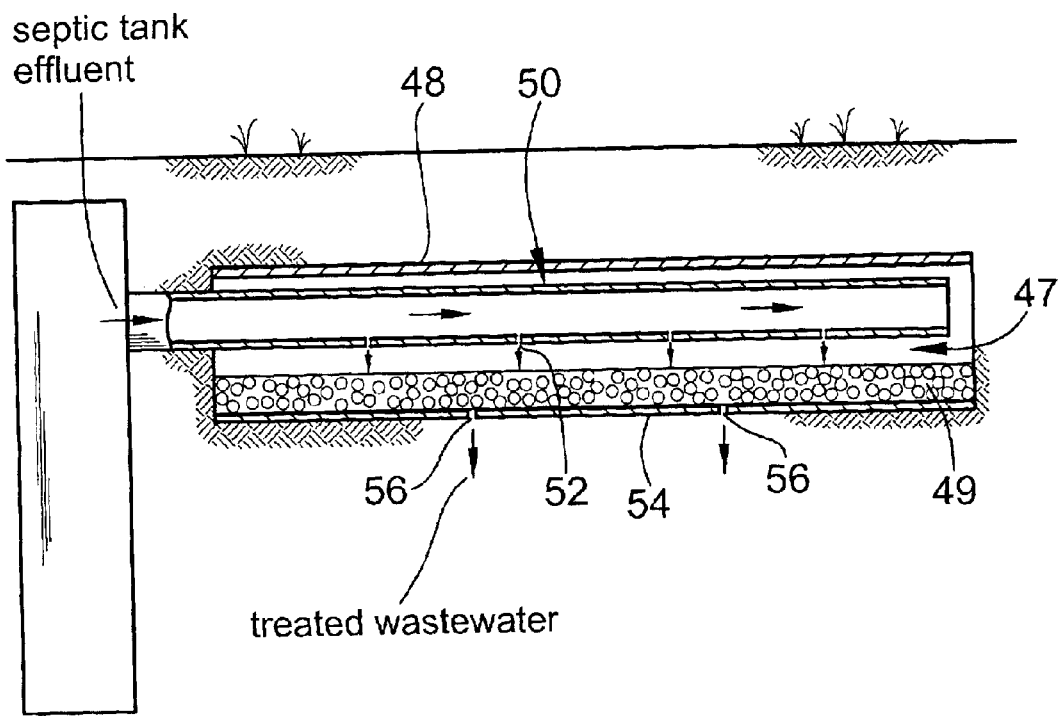

FIG. 9a is a cross-sectioned side-view of the system of FIG. 9.

Figure 10:
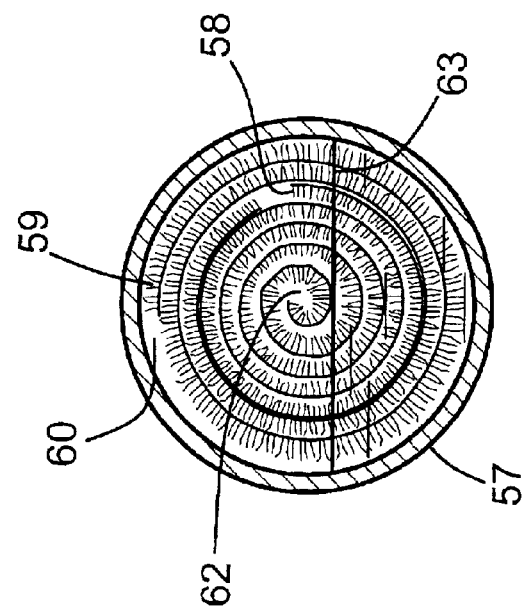

FIG. 10 is a pictorial view of another system that embodies the invention.

Figure 16:
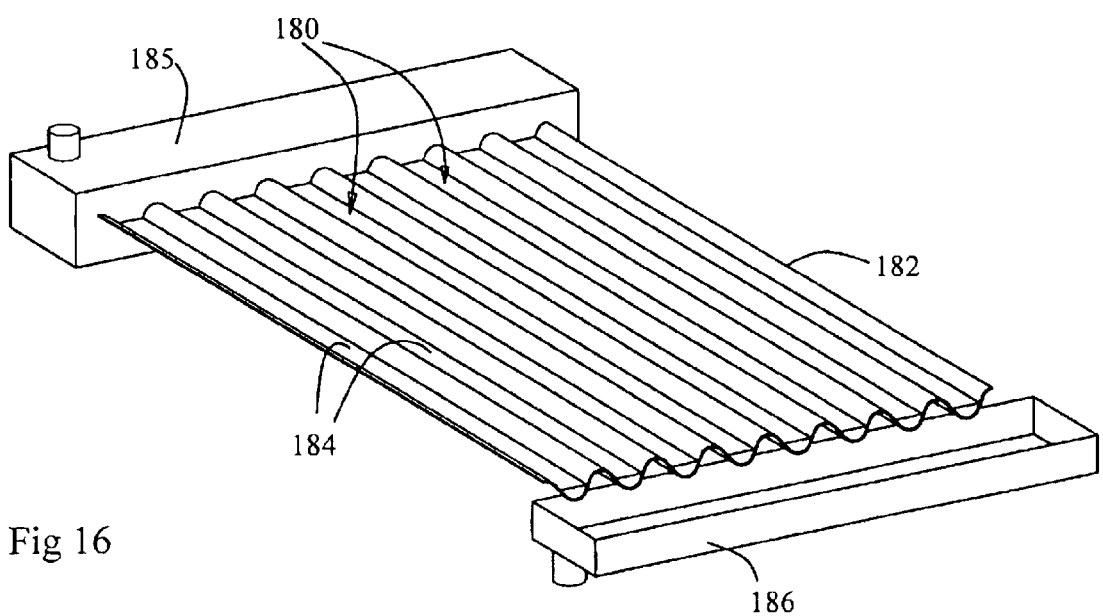

FIG. 16 is a pictorial view of another system that embodies the invention.

The systems shown in the accompanying drawings and described below are examples which embody the invention. It should be noted that the scope of the invention is defined by the accompanying claims, and not necessarily by specific features of exemplary embodiments.

Figure 1:
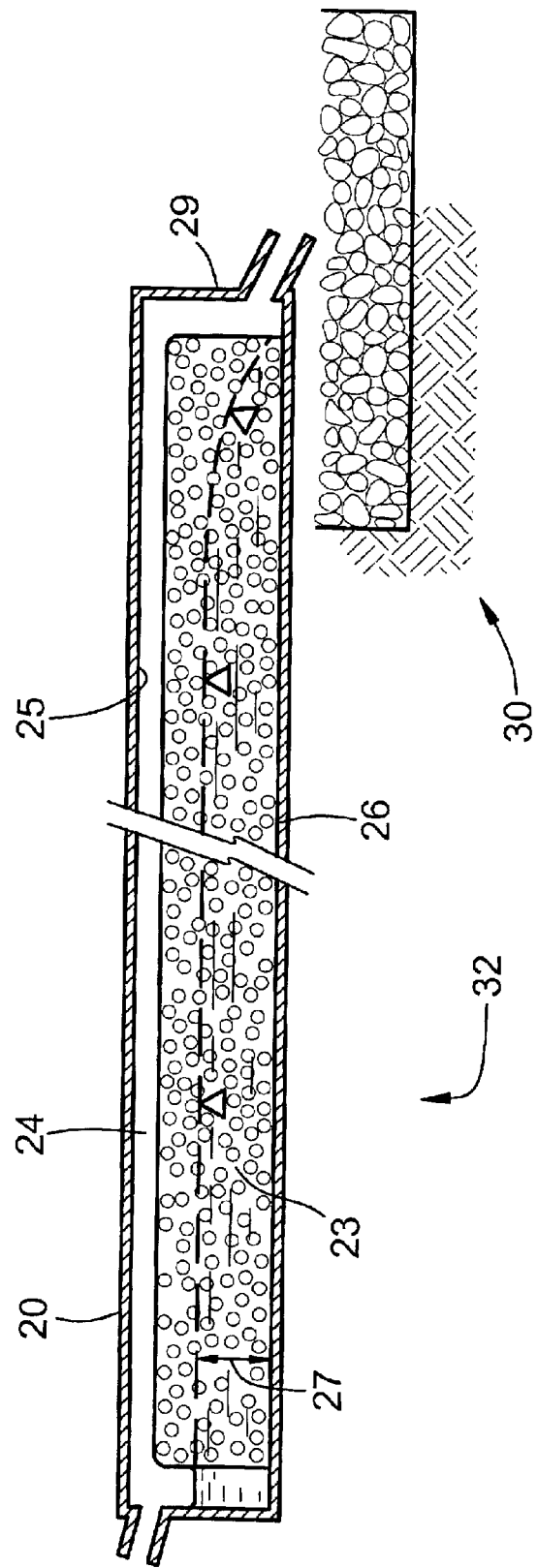
FIG. 1 is a diagrammatic cross-sectioned side view of a system for treating wastewater that embodies the invention.

In FIG. 1, the pipe 20 has a length of about fifteen meters, and a diameter (internally) of about twenty-five centimeters. The pipe 20 is made of a plastic (polyethylene, PVC, etc) material that is inert as far as wastewater and the pollutants commonly found in wastewater are concerned.

Inside the pipe 20 is a body 23 of plastic foam material. Again, the foam is of a plastic material that is inert as far as wastewater and the pollutants found in wastewater are concerned. (Types of treatment material other than foam may be considered for use in the invention, as will be described later.)

Figure 2:
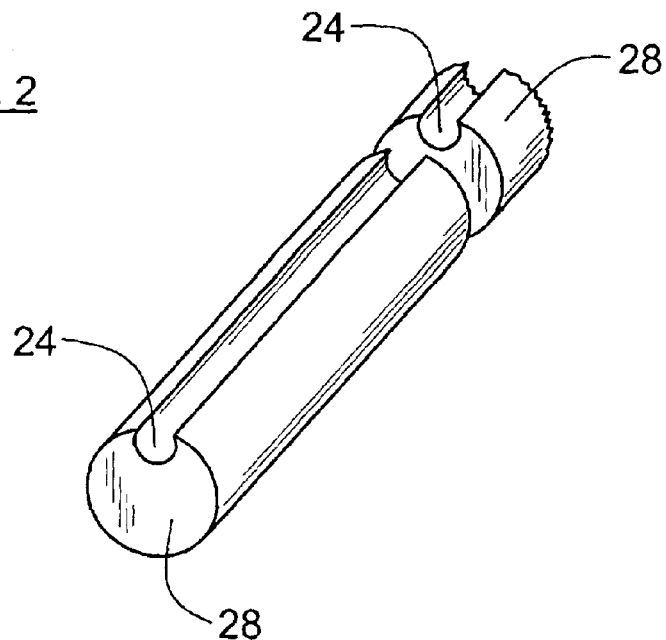
FIG. 2 is a pictorial view of a body of foam material, which is a component of the system of FIG. 1.

The body 23 of foam is configured as shown in FIG. 2, and is dimensioned so as to fill the pipe 20, except that an air passage 24 is created between the top of the foam and the roof 25 of the pipe 20. The body 23 of foam is tight against the floor 26 of the pipe. The air-passage 24 is open to the atmosphere. The air-passage 24 is of large enough cross-section to ensure that air can pass easily along and through the whole length of the pipe 20. In the 25-cm diameter pipe, as shown, the air-passage 24 should have a cross-sectional area of about forty square cm.

The air-passage 24 also serves another purpose. If there were to be a sudden excess influx of wastewater, the overflow of water can be received into the air-passage, and can be directed further down the pipe, until it can infiltrate down into the foam. Of course, the treatment system must be adequate for the task for which it is designed, and the system would be inadequate if an overflow of incoming water could reach, and be discharged from, the far end of the pipe without soaking down into the foam.

It will be understood also that if the portion of the foam material near the inlet should become plugged (e.g with slime or other solid treatment products), whereby water is inhibited from soaking into that portion of the foam material, again the incoming water can be received in the air-passage, and can thereby be directed further down the pipe.

The air-passage 24 must be large enough to perform these functions. If the excess overflow water flowing down the air-passage is to have the opportunity to soak down properly into the foam, the surface area of foam presented to the water must be adequate; that is to say, if the air-passage were too small, the overflow water might be conducted right through the air-passage, and be discharged, untreated, from the far end of the pipe. For this reason, the designer should see that the cross-sectional area of the air-passage 24 is at least ten square cm. Also, if the cross-sectional area of the air-passage were smaller than ten sq cm, air access to the foam might be inadequate. The main purpose of the pipe 20 is to contain treatment material, rather than to contain air passage; so, given that the 25-cm pipe 20 has a total cross-sectional area of just under 500 sq cm, the air-passage 24 should not be more than about 100 sq cm, as that would just waste space inside the pipe.

The foam is of the interconnected or open-cell type, whereby water can pass through the cells of the foam with a measurable velocity. The cells are small enough to provide a substantial capillary effect. The capillary effect should be strong enough that, after the pipe 20 has been filled with water, such that the body 23 of foam material is saturated, and then after the water has drained freely out of the pipe, some water is retained in the body of foam material. The foam material should be such that after a period of, say, one hour after dosing has ended, water is retained to a depth 27 (FIG. 1) of between five cm and fifteen cm. If more water were to drain away than this, the water would not be retained in the pipe for a long enough residence time. If more water than this were retained, that would mean the foam might not be sufficiently permeable, whereby incoming water might tend to flow straight through the pipe, i.e through the air-passage 24, rather than to infiltrate down into the body 23 of foam material.

To have the right degree of absorbency and capillarity for use in the invention, the foam preferably should have a porosity of between about ninety percent and ninety-six percent.

After the system has been in use for long enough to reach steady operating conditions, the free-standing depth 27 of water will be present in the pipe at all times. Of course, if the system were to remain disused for a long period, say a few months, the treatment material might then dry out, and then the microbe colonies might need to be re-established, upon re-commencement of treatment operations.

An alternative to retaining the water in the treatment material by means of the absorbency and capillarity of foam, is that the water may be collected upon emerging from the treatment material, and recycled therethrough. This would entail the use of a pump, pipe-work, flow control valves, etc, and is not preferred, but may be done in a particularly difficult installation.

Another alternative, or supplement, to retaining water in the treatment material by the absorbency of the treatment material is to configure the outlet port of the pipe in the form of a weir. Then, when water has finished draining out of the outlet port, still a volume of water is retained in the pipe, and in the treatment material in the pipe. Where the treatment material is absorbent, the portion of the treatment material below the level of the weir will remain saturated, as will a layer of the treatment material above the level of the weir. Above that, capillary action will be sufficient to support a smaller mass of water, so there are wet layers and moist layers, and above those, the treatment material will be dry. As a new dosing of water to be treated is added at the inlet end of the pipe, the level of saturated, wet, and moist layers rises, until steady conditions once more obtain.

In most domestic wastewater systems, water enters the pipe not as a steady flow but as periodic doses. Of course, systems vary as to volume of water per dose, and as to the frequency of dosing. A typical system might have an average dose size in the ten to twenty liter range, at a dose rate between ten and a hundred times a day.

As a water dose arrives, so the incoming water fills up the left end of the pipe. Now, there is (or may be) more water at the left end of the pipe than can be supported by the capillary action of the foam at that location. Water already present at the left end of the pipe is displaced further along the pipe, i.e to the right. The effect is progressive, whereby when twenty liters of water enters at the left end, a corresponding twenty liters of water is discharged (after a period of time) from the right end. But the water that is discharged from the right end is water that has been resident inside the pipe for a considerable time, having been displaced progressively, in a bucket-brigade mode of progression, rightwards along the pipe each time more water is dosed in from the left.

It will be understood that, usually, as a new dose of water is added at the left end, a corresponding equal volume of water will not be immediately discharged at the right end. The discharge might be immediate if the pipe had not been left to drain at all since the previous dosing, and the foam material in the pipe would be already saturated to full capacity. But usually, the foam material in the pipe will have drained enough, between dosings, that it takes a considerable lag time for a dose applied at the left end to produce a corresponding discharge at the right end. Indeed, the designer should seek to so arrange the system that, in spite of the dosings of water at the left end being periodic, there is a more or less steady trickle or discharge flow of water (of the same aggregate flow rate) at the right end. The standing water level 27 represents the level at which the water is retained, by capillary action, over substantially long periods; dosing causes the water level to rise quite quickly, at the left end, above the level indicated by numeral 27, but then the water level drops back to the level 27 much more gradually. Consequently, water trickles out gradually from the right end. That is to say, although the water entering the inlet end tends to be in spaced doses, water may emerge from the outlet at a more or less constant flow rate.

The designer should see to it that the system is sized, in relation to the dosing rate, such that the water has a residence time, within the pipe, of preferably about twelve hours. Of course, the residence time depends not only on the sizing and arrangement of the treatment material, but also on the wastewater-producing habits of the owners/users of the system. But the designer should recognise that a system in which wastewater might pass right through the aeration station in less than about two hours would not be expected to treat the water adequately. Less than that, and the degree of maintenance to keep the foam from becoming plugged up would be excessive.

The water residing in the pipe is within a few centimeters of a supply of oxygen, i.e the air in the air-passage 24. Under these conditions, colonies of aerobic microbes can form on the matrix of the foam material, and be extremely viable. The water level is static most of the time (during operation of the system), and the water is slowly moving through the pipe, whereby the microbes have ample opportunity to extract the needed nutrients from the water, but the water is continually being replaced, so the microbes receive fresh supplies of nutrients.

If the designer can arrange for the stabilised capillary-supported depth 27 of the water to be more than about five cm, the aerobic reactions can be so thorough that a lower portion of the depth of water can be depleted of oxygen. In that case, anaerobic reactions can take place; these can be beneficial in that, if the conditions were only aerobic, slime and solids might tend to build up in the foam. It is beneficial to promote the anaerobic conditions, if possible, because these are the products that are predominantly addressed by anaerobic treatment.

Figure 3:
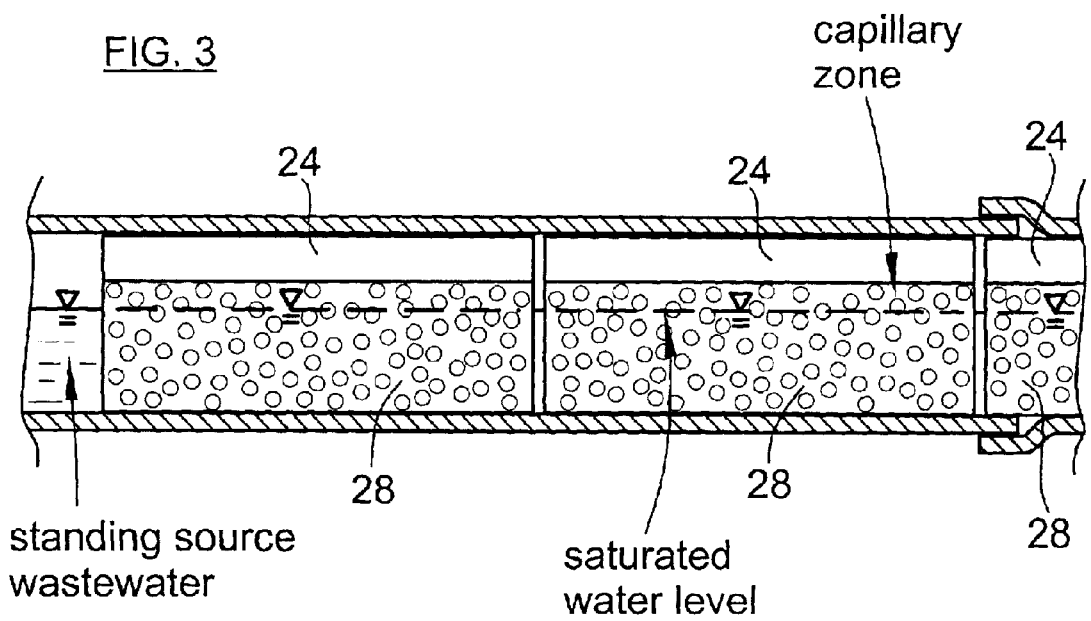
FIG. 3 is a close-up of a portion of FIG. 1.

The block 28 of foam as illustrated in FIG. 2 typically is 1½ meters long. Several such blocks 28 make up the whole length of the body 23 of foam. As mentioned, the pipe 20 is fifteen meters long, and, in this particular case, the pipe contains ten blocks. As will be understood from FIG. 3, sometimes the blocks 28 of foam will abut tightly, with no gaps, but it does not matter if gaps do appear between the blocks. Of course, gaps waste premium space, and are disadvantageous for that reason.

The pipe 20 may be in one long length, rather than short lengths joined together. The designer preferably should arrange the system so that the foam material can be removed and replaced, for future servicing, which is generally more convenient if the pipe is straight, and in short lengths.

The blocks should be assembled into the pipe such that no passageway or conduit can open up, being a passageway that would allow the water to by-pass the foam, because that might allow the water to flow along the pipe without encountering the microbe colonies. It is important that the water does not just quickly pass through the habitation of a few microbes, but that the water should encounter meter after meter of vigorous colonies of microbes.

The blocks 28 must be the right way up: if any block were orientated such that the air-passage 24 was near the floor 26 of the pipe, water would simply flow through the air-passage, without treatment. While it is not essential that the air-passages of all the blocks be exactly at the top of the roof 25, it is important that the blocks should be orientated relative to each other such that the air-passages of the respective blocks match up, so that air can pass along the aggregate length of the pipe.

In some cases, it may be adequate for the air-passage 24 to be open at just one end of the pipe 20, but preferably the air-passage is open at both ends, in order to encourage air to move freely along the air-passage. Holes may be punched in the roof 25 of the pipe, to improve air circulation, if desired (provided water cannot escape through those holes, under all conditions of dosing rates and flow volumes). The prudent designer aims to provide that the system will cope with (short-lived) abusive overloads of the system.

Upon emerging from the exit-end 29 of the pipe, the treated water remains to be disposed of. It may be appropriate to empty the water straight into a stream or lake. Or, it may be appropriate to collect the water, for recycling or other purposes. More usually, however, the requirement is for the water emerging from the pipe to be infiltrated into the ground. In FIG. 1, this is done through an infiltration station 30.

In FIG. 1, the pipe containing the body 23 of foam, comprises a highly efficient aeration station 32. The aeration station 32 promotes the oxidation reactions; i.e if the water from the septic tank has a high organic content, the aeration station supplies the oxygen needed to diminish the carbonaceous-BOD and the total suspended solids (TSS). Oxidation (nitrification) of ammonium can also occur.

There are many conventional structures that can be used at the infiltration station 30. It may be noted that in a conventional septic treatment system, which has a conventional tile-bed soakaway, the tile-bed soakaway comprises not only the infiltration station, but the tile-bed soakaway also doubles as the aerobic treatment station. It is recognised that the function of the conventional tile-bed as an infiltration station is much less demanding (in terms of the size of bed required) than its function as an oxidation treatment station.

In FIG. 1, the infiltration station 30 comprises a soakaway, but now the soakaway can be much smaller (and cheaper) than the soakaway would have to be if the soakaway itself served also as the aerobic treatment station. To repeat: a conventional tile-bed combines the functions of aeration station and infiltration station. Since a conventional tile-bed does not always make a very efficient aeration station, the whole installation is large, which is not only expensive but occupies a large area of land. By separating the aeration function and the infiltration function into two separate stations, i.e the aerobic treatment station 32 and the separate infiltration station 30, as in FIG. 1, the overall installation can be more economical, and can use the available premium space more efficiently.

Figure 4:
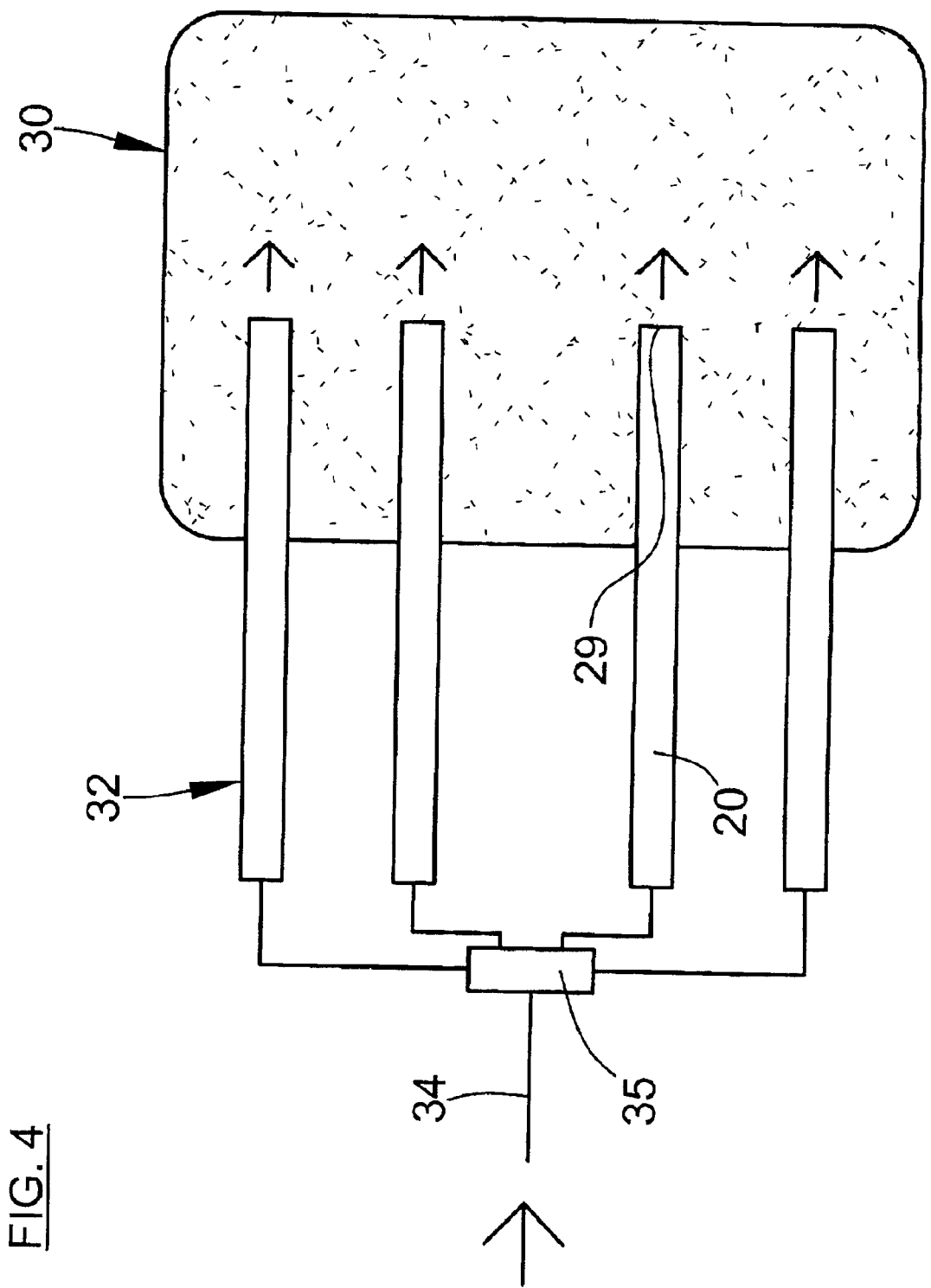
FIG. 4 is a plan view of the treatment system of FIG. 1.

FIG. 4 is a plan view of a wastewater installation. Un-aerated water from the septic tank enters the system at 34, and a distribution box 35 (of conventional design) distributes the water between the four pipes 20, as shown. The four pipes as shown are straight and parallel, but that is not essential: sometimes it might be more convenient to arrange the pipes in curves, to follow the contours of the land, or for the pipes to fan out from the distribution box.

Once the sewage flow rates and dosage requirements that the system will have to cater for have been determined, the designer needs to choose between having one large pipe, or several smaller-diameter pipes. The factors to be considered when making this choice have to do not so much with the aeration station itself, but e.g with the depth of workable soil at the site, and the ability of the ground material at the site to accept the discharge of treated water over a long period of service.

The treatment material as shown in FIG. 2 is of open-cell, or interconnected-cell, plastic foam. Foam is preferred as the microbe-habitation material because foam can be produced in the desired shapes easily and cheaply. Foam can be made flexible and resilient, whereby the foam can be a tight fit in the pipe, which ensures water cannot by-pass the foam, and by-pass the colonies of microbes residing in the foam. Plastic foam material can easily be formed into a cross-sectional shape that just fills the pipe.

Other materials may be used as the microbe-habitation material, if they are absorbent and permeable. For example, peat may be used. Another suitable material is rock-wool. Rock-wool comprises a mat of fine threads or fibres of rock, ceramic material, glass, etc. Rock-wool, like open-cell foam, provides very effective habitations for microbe colonies, while having only a minimal tendency to become clogged with slime and solids.

Rock-wool also, like foam, has the capillarity or absorbency to retain the water within the material for a good time period. It is beneficial for the water to be retained, since that enables an efficient use of the material. As water drains out of the treatment material between dosings, inevitably a certain portion of the volume of the treatment material becomes empty of water between dosings; and the smaller this portion, the more efficient the use of the material, and the more efficient the use of the volume needed to contain the material.

To illustrate this point, attention is directed to FIGS. 5a,5b,6a,6b. (In FIGS. 5a,5b,6a,6b, the vertical distances are exaggerated.)

In FIGS. 5a,5b, a porous treatment material comprises highly-absorbent foam or rock-wool. FIG. 5a shows the situation just after a dose has been applied to the left end of the pipe. The material is saturated, right to the top of the material, for a length LS, the rest of the line of the water-table being as illustrated. Then, dosing ceases, i.e no more water is applied to the left end. Some water drains out of the right end of the pipe, and the water-table in the pipe gradually sinks. After a time, which might be several minutes, or perhaps half an hour or more, the water-table has sunk to a stabilisation level, as shown in FIG. 5b, at which no more water, or only a small trickle, drains out of the right end (assuming no more doses have been applied in the meantime at the left end).

In FIGS. 6a,6b, the porous treatment material is a coarse sand or gravel, having only a minimal (though not zero) absorbency. (The designer should not specify a fine sand, which, though more absorbent, would not have the required permeability.) Now, immediately after the dose is applied (FIG. 6a), the equivalent of the saturated length LS is much shorter. Also, (FIG. 6b) the between-dosings water-table stabilises at a much lower level. Furthermore, the time taken for the water to drain out, from the FIG. 6a condition to the FIG. 6b condition, is shorter than the time for the water to drain out from the FIG. 5a (absorbent foam material) condition to the FIG. 5b condition.

The volume of wastewater that is effectively presented to the microbe colonies for treatment depends on the volume of wastewater that is retained within the treatment material between dosings. The effectiveness of capillary absorbency may be seen by comparing highly-absorbent foam or rock-wool (FIGS. 5a,5b) with minimally-absorbent sand/gravel (FIGS. 6a,6b). In FIGS. 6a,6b, the length of the pipe, and the length of the treatment material, would have to be much greater in order for the retained volume of wastewater to be comparable.

Sand can be used in the invention, provided it has some capillary absorbency, and provided the extra length of pipe can be accommodated. It is contemplated that, where the material lacks absorbency, in place of resorting to more material, the water emerging from the exit end of the material can be collected and re-cycled through the treatment material; possibly several times. A sand, or gravel, or other porous material, that basically has no capacity for capillary absorption, is not preferred for use in the invention.

A material is suitable for use in the invention if the material is capable not only of supporting vigorous colonies of microbes, but preferably is capable also of capillary action; that is to say, the material should retain and support a substantial body of water, within the material, after the material has been saturated with incoming water. Thus, the material is such that water moves through the pipe, from end to end, progressively, with each dosing of incoming water.

To be suitable for use in the invention, the material has to be porous and permeable. Fine sand or Silt would soon become clogged and plugged with solid products, and should not be used. In fact, when it comes to clay, silt, sand, gravel, etc (termed particulate materials herein), as the material for the invention, it should be understood that the range of properties that will lead to effective treatment is quite narrow; the smaller the particulates, generally, the more absorbent the sand material, but the more likely it is that the material will become clogged with slime and solids. Thus, although particulate materials can sometimes be acceptable, generally, particulate materials are not preferred.

Preferably, the nature and volume of the treatment material, and its arrangement in the pipe, should be such that the volume of wastewater retained in the treatment material between dosings is several times larger than the volume of the individual dosings.

To use rock-wool as the microbe-habitation material, the material may be pre-formed into a body having a cross-sectional shape similar to that shown in FIG. 2, or may comprise loose material, placed in a bag, with an air tube (and with a means for ensuring that the air tube is at the top of the pipe).

The shape of the pipe and of the treatment material should correspond, to make sure there are no free channels or pathways the water might take through the pipe, and thereby by-pass the treatment material. The treatment material should be tailored to fit tightly against the (bottom of the) pipe, whether that is round, square, or of another shape.

After the treatment system has been operating for some time, the treatment material can be expected to have become divided into treatment zones. The treatment material in the first few meters of the treatment pipe will be stained and discoloured, which is the usual indication of an effective decrease of the carbonaceous-BOD (organic) content. Downstream of that zone, the treatment material is less discoloured, and this less-discoloured zone extends for many meters, indicating a large capacity for treating the ammonium and pathogen pollutants, in the pipe, down to very low concentrations.

It can be expected that a well-designed treatment pipe system will clean the water down to a level of ten mg c-BOD per liter, ten mg TSS per liter, and three mg ammonium per liter.

After a long period, it should be expected that some zones of the treatment material in the pipe might have become clogged with a build-up of slime and solids. The system can cope with such clogging, because, if it happens, doses of incoming water simply flow along the air-passage 24, and by-pass the clogged area; the incoming dose of water passes downstream along the air-passage until it reaches a zone of the treatment material that is not clogged. An incoming dose of water simply overflows along the air-passage until it can soak down into the foam material.

The treatment material cannot be expected to last for ever, and the system may have to be cleaned out. This is a simple enough operation, in that the designer can easily arrange for the blocks of foam to be removable from the pipes, for service, and can usually arrange that the blocks are removable, and replaceable, without the pipes having to be dug up or dismantled.

As shown, the pipe 20 is arranged in a horizontal configuration and water passes along the pipe in the manner as described; that is to say, as an incoming dose appears at the entry-end of the pipe, corresponding volumes are water are displaced, in bucket-brigade fashion, along the length of the pipe, and a corresponding volume of water drops out of the exit-end of the pipe, over a period of time. To promote this manner of movement of water through the treatment pipe, it is not essential that the pipe slope downwards towards the exit end. The pipe might even slope (very slightly) uphill, and a volume of water would still emerge from the exit-end when a dose is applied to the entry-end. (Uphill is not recommended, though, because water might pool in certain areas and become stagnant, or block the air-passage.)

The designer should arrange that the slope of the treatment pipe should be kept to a minimum. Preferably, the treatment pipe should be horizontal, or slope slightly downhill. It is recognised that the treatment pipe, containing a body of foam or other treatment material, does not need to be installed with a constant accurate horizontality, or a constant accurate slope. So long as the pipe is approximately horizontal, that will do. In the treatment pipe, it is an aim that the water should flow horizontally along the pipe—although of course the predominantly-horizontal flow is driven by gravity-induced pressure heads. Alternatively, sometimes, depending on the nature of the treatment material, and the manner of retaining water in the treatment-pipe, the treatment pipe may be inclined at a considerable slope.

FIGS. 7 and 8 show an alternative manner of infiltrating the treated water into the ground. Here, the treatment pipe 41 is located inside a chamber 40, which is formed from a plastic hood 42. The hood is located in an excavated trench, and covered over with soil etc. The design of the hood and the trench is such that air can enter the air-passage 43. It can be arranged that air enters the chamber through the hood, and through a light covering of soil, if the hood and the soil are suitably permeable. The treatment pipe 41 is supported off the floor 45 of the chamber, either from the floor or from the hood.

Water emerges from the exit-end 46 of the pipe, into the void space of the chamber 40, and travels along the floor 45 of the chamber. The floor may be bare soil, or may have pebbles etc to help spread the infiltration uniformly over the area.

FIGS. 9 and 9a show another alternative arrangement. Here, a similar chamber 47, with a hood 48, is provided, but now the treatment material 49 is placed on the floor of the chamber, i.e on the ground. The pipe 50 itself contains no treatment material. Incoming doses of water travel along the pipe, and the water drips from holes 52 down onto the treatment material underneath. The water then moves laterally through the treatment material before entering the ground. The drip-rate through the holes 52 and the volume of the pipe 50 should be small enough that one dose of water fills the pipe; if the pipe were larger than that, or the volume of water per dose were too small, the water in the dose might not reach the far end of the pipe. To ensure that the pipe is filled along its length, it might be preferred for the incoming water to be collected prior to being fed into the pipe, and pumped into the pipe in doses of, say, twenty liters.

In some cases, steps must be taken to ensure that the water passes lengthwise (i.e horizontally) for a considerable distance, through the treatment material. To this end, it may be arranged that a plastic trough 54 be interposed between the treatment material 49 and the soil of the floor of the chamber 47. The trough 54 ensures that water cannot escape downwards and into the ground soil except at gaps or holes 56 in the trough. The gaps 56 do not lie underneath the drip holes 52, but are positioned so that water has to travel horizontally through the treatment material 49.

Basically, in the invention, the volume of treatment material through which the water passes is large, but the volume is configured as a long channel of narrow cross-sectional area, rather than as a volume having a short-length, wide-area, configuration. The long-narrow configuration of the conduit of treatment material through which the water is constrained to pass, ensures that the incoming doses remain within the treatment material for a long residence time. The long-narrow configuration promotes the desired bucket-brigade mode of transport of the water progressively along and through the treatment material. The long-narrow configuration ensures that, as much as possible, the water cannot by-pass any portion of the volume of the treatment material.

Any portion of the volume of treatment material that is not effectively being used to treat wastewater, would be wasted. It is an aim of the invention to maximise the portion of the volume of the treatment material that is available for use, and is used, to treat wastewater.

Another major benefit that arises from the treatment material being configured in the long-narrow configuration is that the water to be treated is applied, locally, just to one end of the treatment material. This may be contrasted with conventional systems in which the incoming water has to be forcefully spread out, and spread out reasonably evenly, over a horizontally-large area of treatment material. Consider, for example, the conventional systems where the treatment material is configured basically as a horizontal mat, and the incoming water has to be sprinkled over the whole of the upwards-facing surface of the mat. This requires the provision of a (powered) sprinkler or similar horizontal water-distribution system. In those systems, if the water were to be fed just to a single point above a horizontally-extending mat, the water would not spread evenly over the whole mat, but would simply penetrate down through just the immediate sector of the treatment material.

By contrast, the long-narrow configuration of the treatment material does enable water to be fed into a large body of treatment material from a single inlet point, without the use of sprinklers or distribution systems. In a well-engineered system that embodies the invention, all the water entering the system, upon being simply placed at the left end of the pipe, cannot fail to flow along the pipe, and cannot fail to pass through meter after meter of well-aerated microbe-laden treatment material.

It is not ruled out in the invention that a pump might be needed for moving water to the inlet point. However, a conventional system that uses a sprinkler to spray water outwards and downwards onto the treatment material is much more likely to need a pump than a system that simply places the water alongside the treatment material.

Some of the differences will now be considered between the above-described type of aerobic treatment station, and a conventional aerobic treatment station, of the kind where water falls or trickles downwards through the treatment material. In the conventional system, a water distribution system has to be provided, to spread the water, horizontally, over the whole area of treatment material. Any portion of the material to which water was not conveyed by the horizontal distribution system would just be wasted. In the present system, water is caused to flow through, and to fully utilise, the whole body of treatment material, simply by the geometry of the pipe or trough. No powered sprinkling or distribution system is needed. The water is fed in at the inlet end of the pipe, and simply flows horizontally along the pipe, through the body of treatment material, and out at the other end of the pipe.

With this arrangement, the designer can arrange that the water flows through many meters of treatment material, and (just as important) that the water cannot escape or by-pass that long length of treatment material. The line of the many meters of treatment material through which the water passes is horizontal, not vertical, and that line can be made many meters long with very little difficulty of structure. By contrast, it would be very inconvenient to provide for water to flow through many meters of treatment material, if the water were arranged to flow vertically downwards through the treatment material, whereby a long vertical flow really cannot be done in the context of a small domestic treatment installation.

Furthermore, water flowing horizontally through a body of treatment material can very easily be retained in the body of material, whereby the treatment reactions can continue over a long period; by contrast, in a vertical system, the water is only retained within the treatment material for a few moments.

It is not essential that the treatment material must provide capillary action. The treatment material should be such that the material will support colonies of microbes, and should be such that the material will not easily become clogged with slime. Also, the configuration of the treatment material, and of the constraints that determine the pathways the water takes in passing through the treatment material, should be such that the doses of water pass through in bucket-brigade mode.

These criteria can be met with an alternative form of material, as shown in FIG. 10. In FIG. 10, a round pipe 57 contains inner and outer pieces 58,59 of bristle-mat. The mat comprises artificial turf, such as AstroTurf (trade name). The two mats of artificial turf are rolled into spirals, one left-handed, the other right. The arrangement leaves an outer gap, which serves as an air-passage 60, running along the length of the pipe 57. The arrangement also leaves another gap 62, running the length of the pipe, being the central tubular passageway as shown. The mat should be so selected for size, and be so arranged, that the bristles or blades of the artificial turf are compressed slightly, whereby the mat fits tightly against the walls of the pipe.

Water dosed into the pipe 57 enters between the turns of the mat, and flows along lengthwise between the turns. The artificial turf material provides an excellent habitat for microbes, and the arrangement means that there is ample provision for circulation of air, and for oxygen access for microbes residing on the bristles or blades of the turf mat.

Artificial turf does not promote a capillary action, and therefore if the pipe 57 as shown in FIG. 10 were to be inclined downhill, it might happen that too much of the water being treated would drain out of the pipe, and out of the treatment material, between dosings. The FIG. 10 pipe therefore should be arranged so that water does not drain completely, between dosings, which can be done by placing the water outlet (slightly) higher than the bottom of the pipe. This can be done by forming a weir at the outlet end of the pipe. Now, the water remains in the turns of the rolled mats, between dosings, and the long-narrow character of the water-ways between the turns promotes the desired bucket-brigade mode of movement of water along the pipe, as each new volume of water is dosed in. The water should occupy approximately half the cross-sectional area of the pipe: the line 63 indicates an optimum residual water level.

The retained water level should not be so high that the gap 62 provides an open channel, along which water could flow without hindrance straight to the outlet. The bristles and blades of the artificial turf material do provide a hindrance to flow, in that they take substantially all the kinetic energy out of the moving water; it should be regarded that water passes along the pipe 57 by seeping therealong, rather than by flowing with a velocity, and the pipe, and the roll of turf, should be sized accordingly.

If an area of the blades or bristles should become clogged with solids and slime, water could flow up and around the curved paths between the turns, and over the obstacle. There is generally no need for the mat to be perforated (to give direct communication between turns) and too many perforations might lead to too many possible pathways through the treatment material, and to the water starting to establish channels and pathways. On the other hand, if desired, the mat may be perforated.

As mentioned, it is a preferred feature of the invention that the water be constrained to flow through a volume of treatment material that is configured as a long-narrow volume. The more the material is disposed, with respect to the passing water, in a long-narrow configuration, the less likely it is that preferred pathways might develop in the material, whereby water might by-pass some of the material.

The manner in which the long-narrow character of the treatment material is defined, in the context of the invention, will now be discussed. The water may be regarded as flowing through or along a pipe or trough, in which the treatment material is contained. The trough has a floor, which is contiguous with left and right side-walls.

If the water-conduit had a simple rectangular cross-section, the floor and side-walls of the water conduit would be immediately defined. When the water-conduit is some other shape—a round pipe, for example—just what constitutes the floor of the water-conduit is not so immediately clear. In the context of the invention, the floor of the water-conduit is preferably defined as including not only the bottom of the conduit but also those portions of the conduit walls that face upwards, and lie at no more than thirty degrees to the horizontal. Insofar as it makes a difference, a portion of the water-conduit walls that lies more steeply to the horizontal than thirty degrees should be regarded as a portion of the side-wall of the water-conduit, not as a portion of the floor.

The treatment material rests on, and makes contact with, the floor of the water-conduit. The treatment material also makes contact with at least a lower portion of the side-walls of the water-conduit. The floor of the water-conduit includes contact-patches, where the treatment material actually touches the floor, and non-contact-areas, between the contact-patches, where the treatment material does not touch the floor. If the treatment material is in touching contact with the whole of the floor surface, the non-contact-areas in that case would be zero, and that is to be desired, but zero is not essential.

The water, in passing from the entry-port to the exit-port, takes flow-paths through the treatment material. The flow-paths are traced on the floor of the water-conduit, by water passing from the entry-port to the exit-port, and the flow-paths incorporate the non-contact-areas of the floor, if such be present.

The clearest-flow-path is the flow-path that brings the water into the least contact with the treatment material. It is a preferred feature of the invention that even the clearest-flow-path lies within two millimeters of the treatment material over a distance of at least ten meters.

In the invention, it is preferred that the width of the water-conduit be narrow, defined as follows. The width of the floor of the conduit, as measured laterally with respect to the length of the water-conduit, is W1 meters at a point T1, is W2 meters at a point T2, and is WN meters at a point TN. T1, T2, . . . , TN, . . . are points along the length of the water-conduit at which the treatment material is present. It is preferred, in the invention, that at least eighty percent of the widths W1, W2, . . . , WN, . . . are less than forty centimeters. The aggregate of all the flow-paths through the treatment material is the stream-path.

On the other hand, sometimes, it may be desired to spread the treatment system out over a horizontally large area, and at the same time to provide the desired freedom from channeling. FIG. 16 illustrates a treatment system in which the water-conduit is divided into several sub-troughs. The sub-troughs 180 are formed, in this case, in the valleys of a piece 182 of corrugated impervious material, disposed horizontally. The valleys contain respective bodies of treatment material 184. The ends of the valleys comprise entry and exit ports, which communicate with a common entry chamber 195 and a common exit chamber 186.

It should be noted that it would not be satisfactory to provide the horizontal-flow of water through the treatment material, if the body of treatment material were wider, horizontally, than the dimensions indicated. The narrowness is important because it ensures freedom from channelling and pathways through the body of material. If the body of material were provided in the form of a flat slab of foam, say 200 cm wide, inside a suitably-shaped trough with a horizontal floor, and if the water were fed into the slab via an entry chamber across the whole width of the slab, the water can only be expected to traverse lengthwise along the slab, evenly across the slab, for a small distance. With a slab that wide, channelling and pathways would very quickly start to develop, so that, more than a meter or so away from the entry chamber, only a fraction of the width of the slab would be being utilised. Thus it is recognised that the horizontal flow of water should be channelled between impermeable side-walls, which confine the flow to the narrow flow-way, as described. Providing extra width to a body of treatment material does not serve to improve treatment, because the extra width is wasted, as the water forms pathways and channels through the extra width.

The designer should take precautions against freezing, if appropriate. The pipe should be free-draining, and typically buried with about fifteen cm of soil above the pipe, to accommodate minus 20 degC. More soil or insulation should be provided over the pipe in colder climates.

THE SECOND ASPECT OF THE INVENTION, IN RELATION TO THE PRIOR ART

In a second aspect, this invention relates to the treatment of wastewater, being wastewater e.g from a domestic dwelling, and relates especially to the treatment of wastewater as has been traditionally carried out in a septic tank.

Septic tanks have been well known for many years, and many designs have been proposed, ranging from the simple hollow rectangular box-shaped tank, to more intricate and sophisticated designs, in which separate compartments, baffles, and the like, have been used. These sophistications have been aimed at making sure the septic tank performs properly, in the sense that no water can emerge untreated from the tank, and at making sure the septic tank performs efficiently, in the sense that the septic tank performs its functions using a minimum of volume and space.

The traditional septic tanks have been made of concrete, metal, plastic, etc. The material has to be watertight, and must remain so for many years, and has to withstand the stresses arising from settling of the ground, from overloading and other abuses, and the like. Septic tanks have been designed with access hatches, whereby a person can inspect the interior and monitor the build-up of sludge and scum, and through which the sludge/scum can be extracted from time to time.

The second aspect of the invention is concerned with achieving the performance of a traditional septic tank, including promoting the anaerobic digestion reactions, separating sludge and scum from the water by settling, etc, but with achieving this performance in an apparatus that is of a more convenient and efficient configuration and size. One of the aims of the invention is to make it easier to find room for the apparatus, and to make less expensive the task of installing the apparatus, than has been the case with the traditional septic tank designs, and to allow easy installation in areas of high water table or high bedrock.

In one preferred embodiment, the septic tank is basically configured in the form of a long, narrow, pipe. The pipe may be of extruded plastic, having a diameter typically of fifty or sixty centimeters, and being four or more meters long. Such pipes are readily and inexpensively available. They are intended for commercially conveying water, including wastewater, and are intended to be buried in the ground. These relatively small diameter extruded plastic pipes are light in weight, whereby two persons can easily lift a length of the pipe down from a truck, manhandle it, and install it in an easily-prepared shallow trench, in the ground. The second aspect of the invention lies in configuring a structure such as a pipe of this kind, as a septic tank.

As mentioned, rectangular concrete septic tanks are traditional and well known, as are metal tanks. Both are readily available, with or without internal baffles. However, both these materials deteriorate in sewage, especially where sulphur is present. Also, septic tanks made of plastic are known. In particular, it is known to provide a septic tank in the form of a round plastic body, typically about one and a half meters in diameter, and two or three meters long. Theoretically, this body could be extruded, like a pipe, but a more favoured manner of construction is to fabricate the body over a mould, in, for example, glass-fibre-reinforced plastic. Similarly-fabricated plastic end-caps are cemented onto the ends of the round body, prior to installation in the ground. Hatches, ports, etc, have been included in the as-fabricated structures.

The known moulded-plastic septic tanks have been lighter in weight than the comparable concrete tank. However, when the tank is pumped out during service, or if the water table should rise, a tank made of plastic might be prone to flotation. Polyethylene and fibreglass tanks have improved chemical resistance. Fibreglass tanks are very expensive. Polyethylene tanks are not so durable, and can collapse if not installed and backfilled with unusual skill and care. Also, the known plastic tanks still take up more or less the same size of hole in the ground, so there is little saving of space, or of amount of excavation. Also, although the plastic tank is lighter, still a crane is needed to lift the plastic tank off the truck, move the tank to the prepared (excavated) hole, and lower the tank into the hole. As a result, the savings overall, arising from the use of a plastic tank, are marginal.

As mentioned, it is known to incorporate baffles into a concrete or metal tank. The baffles create mechanically-defined pathways along which the water passes. Without the baffles, a wide conduit would be available for the water flow. The tendency is, when the conduit is wide, not for the water to flow at an even rate over the whole cross-sectional area of the wide conduit, but for the water to start to establish unwanted pathways. It has been recognised that, in a case where the water can pass rapidly along a pathway that has developed, from inlet to outlet, the volume of the tank is not being used efficiently. Some of the water, i.e the water in the pathway, now has a short residence time, the rest much longer.

Only when the residence time of all the water is the same is the volume of the septic tank being used at maximum efficiency. The baffles serve to define the pathways along which the water must pass, and serve to even out some of the differences in residence time. Traditionally, baffles provide and define a long/narrow passageway for the water, where, without the baffles, the passageway would have been wide and short.

But baffles are awkward structures to incorporate into a septic tank. If the baffles really are effective to bring all points of the septic tank into equal effect, they will restrict access, and make servicing and cleaning out the tank almost impossible. Plus, the tank is still a tank, even if it contains baffles. And as such, it still requires the heavy lifting equipment, the disruptive excavations, etc, as described. As an example, a 3000-liter traditional (concrete) septic tank may be considered. Such a tank typically requires an excavation that is 2½ by 2½ meters in area, and 2 meters deep. Using the septic-pipe principle (as described herein) instead, the same or better performance can be achieved with a 15 or 20 meter length of 40 cm diameter pipe. A suitable trench for this pipe can soon be excavated, without heavy machinery; and two people can easily pick up 2 or 3-meter sections of 40-cm (plastic) pipe, and instal them in a trench, by hand. Because the volume of the pipe is utilised so effectively, the overall volume of the treatment facility can be reduced. But what can be more important is that the depth of excavation is reduced, and the fact that no crane is needed to install it, especially in difficult and remote areas.

The invention provides another manner by which water can be made to move through a water treatment system, gradually and progressively, the whole body of water moving forwards, with each incoming dose at the inlet end, as an integrated unitary whole body, towards the outlet end.

Again, the aim is to make sure that every drop of water passing through the tank has the same residence time. This aim can be expressed conversely, i.e as the aim to make sure that all of the available space is being utilised equally for the purpose of promoting the treatment reactions and processes.

The second aspect of the invention lies in conducting the wastewater through a septic treatment-trough, rather than through a septic tank. The preferred form of the treatment-trough is a treatment-pipe, and the invention is described herein mainly as it relates to the treatment-pipe.

The treatment-trough, or treatment-pipe, has a long/narrow configuration. The narrowness of the cross-section means that substantially all of the cross-section is utilised, more or less equally, for treatment. In a traditional septic tank, as mentioned. it does not take long for channels and pathways to start to develop in the tank. Then, the incoming doses of sewage water start to take a short-cut to the outlet, and the rest of the volume of the tank is simply wasted.

As a desideratum, the treatment-pipe and the apparatus should be so configured that, when a dose of sewage enters the inlet, the whole volume of water contained in the apparatus moves forwards towards the outlet, as a unitary moving front, over its whole cross-sectional area. Ideally, every drop of water that emerges from the outlet has been inside the pipe for the same residence time as every other drop. When that is so, the treatment-pipe is at its maximum volumetric efficiency, i.e its efficiency in terms of minimising the water volume that is needed, in the pipe, to achieve full treatment. Of course, the ideal cannot be achieved, wherein all drops of water would have exactly the same residence time; however, the long/narrow treatment-pipe performs much closer to the ideal than a traditionally-shaped septic tank.

The scope of the second aspect of the invention is set out in the accompanying claims, but may be summarised as follows. Excess water in the container drains out of the outlet port, leaving a minimum-standing-body of water retained in the container. This minimum-standing-body of water has a standing-water-length, between the inlet and outlet ports of the container. (In fact, for the sake of clarity of definition, reference is made to an inlet-point and an outlet-point, which are the nearest points within the standing-body to the respective ports.)

At each point along the standing-water-length, the minimum-standing-body of water has a standing-width. At a point-P, the width is standing-width-P. Similar, the standing-body has standing-depth-P at point-P.

Some of the points-P along the standing-water-length comprise also points-T of the trough. A point-P is also a point-T if, at point-P, the standing-width-P is less than about ¼ of the standing-water-length. Preferably, the standing-depth-P is also less than ¼ of the standing-water-depth. Any point in respect of which the standing-width at that point is greater than ¼ of the standing-water-length is not a point of the trough.

There is also an overall width limitation in respect of the trough, that the standing-width should not exceed 120 cm. That is to say, any point-P of the container at which the width does exceed 120 cm is not a point-T of the trough. Naturally, the wider widths would only be considered in very large installations, but the designer should have it in mind that at widths above 120 cm, freedom from channelling becomes very doubtful. Therefore, the designer should over-engineer the container, bearing in mind that much of the volume might be wasted due to channelling. A septic container is fed from an inlet-pipe which typically is around 15 cm diameter or less, and the designer cannot count on spreading that concentrated in-flow evenly over a larger width than 120. And the smaller the width, the better the assurance that all the width will be utilised equally. Thus, designing to a width limitation of 100 cm provides a good commercial margin. A width limitation of 70 cm means that the possibility of problems with channelling can really be ignored.

The trough is the aggregate of all the points-T, i.e of all the points-P at which the standing-width is less than ¼ of the standing-water-length.

For the trough to be long/narrow, in the second aspect of the invention, the trough should be at least two meters long.

(It should be noted that, for clarity of definition, the narrowness of the trough is defined in terms of the ratio of the width of the trough to the length of the container, not to the length of the trough.)

In a traditional septic tank, with baffles, the overall path as dictated by the baffles may be long/narrow, within the above definition. However, a tank with baffles is not included in the invention, for the reasons as will be described. A tank with baffles is distinguished, in this second aspect of the invention, by the feature that no portion of the wall of the treatment trough is wetted on both sides by the water undergoing treatment.

DETAILED DESCRIPTION OF PREFERRED EMBODIMENTS OF SECOND ASPECT

Figure 13:
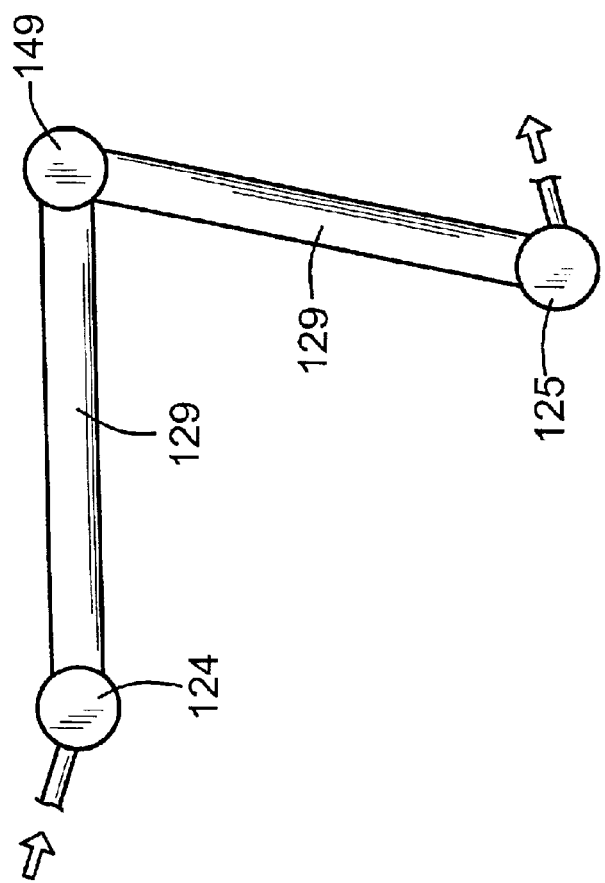

By way of further explanation of the invention, exemplary embodiments of the invention will now be described with reference to the accompanying drawings, in which:

FIG. 11 is side elevation of a treatment apparatus, installed in the ground, which embodies the invention;

FIG. 12 is a cross-section of a treatment-pipe;

FIG. 13 is a plan view of another treatment apparatus;

FIG. 14 is a side elevation of a further treatment apparatus;

FIG. 15 is a plan view of another treatment apparatus.

The apparatuses shown in the accompanying drawings and described below are examples which embody the second aspect of the invention. It should be noted that the scope of the invention is defined by the accompanying claims, and not necessarily by specific features of exemplary embodiments.

The wastewater treatment apparatus 120 shown in FIG. 11 includes an inlet port 123, which receives sewage wastewater from a dwelling, for example a single-family house. The apparatus, to meet the usual codes for e.g a three-bedroom dwelling, should be able to cope with sewage being dosed into the apparatus at the daily rate of 1600 liters per day, being applied at the dose-rate of ten to fifty doses per day, and the following dimensions of the apparatus are set by the need to meet these requirements.

The apparatus 120 includes an inlet chamber 124, which comprises a 1.5 m length of plastic pipe, of diameter 60 cm. The apparatus also includes an outlet chamber 125, which comprises a 1.0 m length of the 60 cm pipe. The chambers are manufactured with holes, having welded or cemented-on flanges and bosses 126, to enable inlet and outlet pipes 127,128 to be sealingly attached thereto, and to enable a treatment-pipe 129 to be connected between the chambers.

The treatment-pipe 129 is of inexpensive, readily-available, extruded plastic (polyethylene) pipe, having a diameter of 45 cm. The treatment-pipe 129 is 16 m long. (Alternatively, the treatment pipe may be, for example, 60 cm diameter and nine meters long.) An insulative and protective covering of soil, 30 cm deep, lies over the buried treatment-pipe.

The apparatus is installed in a prepared (i.e excavated) receptacle in the ground. At the two ends, the excavation accommodates the inlet and outlet chambers 124,125. Between the ends, a shallow trench, barely 1 m deep, and ½ m wide, is all that is needed to accommodate the treatment-pipe. Of course, heavy excavation equipment may be put to use, if available. But septic treatment apparatus is required in respect of all dwellings, including those where access for heavy equipment is not so easy, and/or the ground is difficult to dig, whereby the minimal excavation requirement is especially beneficial. It is an aim of the invention to treat the water in a pipe or trough (which includes a conduit or culvert), the mechanical characteristics of which permit the designer to assure mechanical stability when installed to only a shallow depth.

For the purposes of periodic cleaning and other service, the (horizontal) treatment-pipe 129 itself might be difficult to reach. However, usually, most of the heavy solids (sludge 146) will collect in the deposition-sump 148 of the inlet chamber 124. The lighter solids (scum 147) will float on the surface of the water in the inlet-chamber. Access to the inlet-chamber may be had very easily, by means of a removable hatch 130. In fact, a basket may be placed in the inlet-chamber, and the basket simply lifted out, through the hatch 130—sludge, scum, and all—for servicing. Solids can be expected to collect also in the outlet chamber 125, but in smaller quantities.

It is unlikely that there will be much build-up of sludge in the treatment-pipe 129 itself, since the movement of the water along the pipe (slow though that movement is) will tend to carry solids along to the outlet. The pipe 129 may be set at a (slight) angle to the horizontal, if desired, to help prevent build-up actually in the pipe.

Preferably, the treatment-pipe itself is completely filled with water, i.e there is no air, and no access for air, in the treatment-pipe 129. The pipe 129 is the place where the main organic digestion reactions take place, which reduce the C-BOD of the water being treated, and these microbial reactions take place under anaerobic conditions.

Generally, the inlet and outlet chambers should be vented, to make sure there is no build-up of pressure (or vacuum) inside. The venting may be done via the inlet pipe 127, to a venting stack on the roof of the dwelling, to control odours etc. If the layout of the pipe permits a small airspace on top of the water in the pipe, that is not too important (cf. the airspace above the water in a traditional septic tank), but still the water in the treatment pipe must not be allowed to become aerated, again as in a traditional system. Water undergoing septic breakdown reactions in the treatment pipe should remain substantially still, except for the occasional shifts due to fresh doses of wastewater being added at the inlet.

Major benefits of the invention include the fact that the long/narrow pipe-configuration is excellent at preventing pathways from arising. As a result, all portions of the volume of the treatment-pipe contribute equally to overall treatment performance. Also, the excavated hole in the ground, as needed to accommodate the treatment-pipe, can be done with considerably less expense and disruption than the corresponding excavation needed to accommodate a traditional septic tank.

For the purposes of the second aspect of the invention, the difference between a long/narrow treatment-pipe, as used in the invention, and the long/narrow conduit that arises from the placement of baffles in a conventional septic tank, is that a baffle is a wall that is wetted on both sides by the wastewater undergoing septic treatment. In the treatment-pipe, the walls of the treatment-pipe are wetted by the wastewater only on the inside. The outside surface of the treatment-pipe wall is in contact with air, or with the ground in which the pipe is buried. (The ground might be saturated with water, but that is other water, i.e not the wastewater undergoing treatment.) The traditional septic tank is a large heavy cumbersome structure, and requires a substantial and expensive excavation, and the use of heavy equipment, for its installation. Even then, such structures are fragile, in the sense that the tank can crack, or even collapse, for example if the ground should settle, etc. In the present case, however, the septic container, as a complete unit, has a long/narrow configuration; that configuration means that the overall unit has very high integrity, as a structure. This may be contrasted with a traditional septic tank, in which the treatment path has been elongated by placing baffles inside the tank; the provision of baffles (baffles are wetted on both sides by the water undergoing treatment) does not nothing to change the physical requirements and structural integrity of what is still a short wide tank.

As may be understood from FIG. 11, when water enters the inlet port 123, the volume of water in the apparatus increases, and the level of the water tends to rise, thereby causing excess water to flow out from the outlet port 132. Water drains out of the outlet port, until only a minimum-standing-body of water remains in the apparatus. The level of the minimum-standing-body, and thus the volume of the minimum-standing-body, is defined by the height of the weir 134 at the outlet port 132. The water remains at this level until the next dose of wastewater enters at the inlet port.

FIGS. 11 and 12 illustrate how the dimensions that are important in the definition of the invention (and especially in defining the long/narrow aspect of the invention) are determined. At the inlet end, an inlet-point 135 is established, as the point on the surface of the minimum-standing-body of water which is the closest point to the inlet port. Correspondingly, an outlet-point 136 is the point on the surface of the minimum-standing-body of water which is the closest point to the outlet port. A line is drawn, through the wastewater undergoing treatment, along the shortest route between these two points 135,136. This line is termed the standing-body-length 137.

At each point along the length of the standing-body-length 137, the water has a standing-body-width 138. The standing-body-width is the overall width of the wastewater at that point. Usually, this width will be equal to the maximum horizontal distance apart of the inside-surfaces of the walls of the pipe, at that point. The standing-body-width is the widest width of the water at the point, which may occur at any depth of the water at that point.

FIG. 12 is a cross section of the treatment-pipe 129 taken at a particular point along the standing-body-length 137. The standing-body-width is the maximum internal (horizontal) width of the pipe. The depth at which the standing-body-width occurs is the depth at which the standing-body-width is maximum.

The standing-body-width 138 would not be the width of the surface of the water unless the width of the surface happens to coincide with the maximum distance apart of the pipe walls. Besides, the water need not have a surface at all, over much of the standing-body-length.

The depth 139 of the water is a vertical measurement. The depth is affected by whether there is an airspace 140 above the water.

Point P1 is a point on the inwards-facing-surface 142 of the pipe wall 143, and is a point on that surface that is wetted by the minimum-standing-body of wastewater that is undergoing treatment in the treatment-pipe. Point Q1 is a point on the outwards-facing-surface 145 of the pipe wall, being the closest point on the outwards-facing-surface from point P1, and is separated therefrom by the thickness T1 of the pipe wall at that point. Point Q1 is not wetted by the minimum-standing-body of wastewater undergoing treatment in the treatment-pipe.

This condition (of not being wetted on the outwards-facing-surface) is not true of a baffle. A baffle is, by definition, wet on both sides. In the second aspect of the invention, no portion of the treatment-pipe wall 43 is wetted on both sides by the water undergoing treatment. No portion of the wall of the treatment-pipe doubles as another portion of the wall of the treatment-pipe. The treatment-pipe is of long/narrow configuration, to ensure efficiency of usage, and the long/narrow configuration is achieved, not by putting baffles in a short wide tank, but by providing a structure that is itself physically long and narrow, i.e the treatment-pipe.

The long/narrow configuration is preferably defined by the following dimensional parameters of the treatment-pipe:
(a) the standing-body-length 137 is at least four meters;
(b) the volume of the minimum-standing-body is at least 1.5 cubic meters;
(c) referring to at least fifty percent of the points along the standing-body-length, both the standing-body-width 138 at that point, and the depth of the water at that point, are less than one quarter of the standing-body-length 37.

These dimensional limitations will now be explained.

Traditionally, the smallest size of septic tanks have had a capacity of around 2 cubic meters, which is the size appropriate to (and fulfilling the codes for) a small single-family dwelling. Because the treatment-pipe utilises its volume and capacity so very efficiently, an equivalent degree of treatment can be realised, with a treatment-pipe, of about 1.2 or 1.5 cubic meters.

The "long" aspect of the long/narrow configuration of the treatment-pipe is determined by the limitation that the standing-body-length 137 preferably should be at least four meters.

The "narrow" aspect of the long/narrow configuration is determined by the limitation that the treatment-pipe have a width 138 of, preferably, less than sixty centimeters. The narrowness requirement applies to the treatment pipe portion of the apparatus, not to the end-chambers, which may be wider. But the end-chambers should not account for more than fifty percent of the standing-body-length. At this, it is easy to ensure that no pathways develop in the pipe. The wider the pipe, the more possible it is for unwanted pathways to develop, and for the structure thereby to become inefficient. If the treatment-pipe were to have a width of more than about one quarter of the standing-body-length, the development of unwanted pathways, over a period of time, would be more or less inevitable.

The treatment-pipe should not be so narrow that the water shoots along it at a high velocity, of course, given that motion of the water is not conducive to efficient settling-out of solid debris. A practical lower limit to the narrowness of the standing-body-width 138 would be around twenty-five centimeters; below that, the water would probably be moving too quickly.

It is not essential that the whole minimum-standing-body of water be contained actually in the treatment-pipe. As shown in FIG. 11, some of the water is contained in the inlet and outlet chambers 124,125.

The structure of FIG. 11, i.e the treatment-pipe 129 and the two chambers 124,125, may be pre-fabricated and pre-assembled, as an integrated whole unit, prior to being taken to the site. Alternatively, the final insertion of the pipe 129 into the (factory-formed) flanges 126 in the chambers may be left, to be completed upon installation at the site. In that case, the ease with which the unassembled components can be handled and transported must be set against the difficulty of ensuring, on site, that the seal between the pipe and the chambers is done properly.

Alternatively, the inlet and outlet pipes 127,128 may be coupled directly into the ends of the treatment-pipe, i.e the inlet and outlet chambers 124,125 may be omitted, as separate structures. However, it is more convenient for the manufacturer to make the inlet and outlet chambers as standard components, and then the treatment-pipe 129 is simply a length of standard cylindrical pipe, having no attachment structures fabricated into it. Then, the length of the pipe is the only variable, installation to installation. The presence of the chambers 124,125, with their openable hatches 130, means that the settled-out sludge and scum can be easily accessed, and removed. Easy access is especially important for the inlet chamber 124, since the sludge tends to settle out mainly near the inlet end.

However, the end-chambers should be regarded as being adjuncts to the treatment-pipe. A substantial proportion of the volume of the minimum-standing-body of water undergoing treatment must be contained in the long/narrow structure of the apparatus, i.e in the treatment-pipe. That is to say, at least one half of the volume of the minimum-standing-body of water should be contained within the treatment-pipe itself. If the inlet and outlet chambers were to contain more than one-half of the total volume of the minimum-standing-body, that would mean the chambers were too large, which would be an inefficient utilisation of the available space, and which would lead to the development of unwanted pathways.

Expressed as a linear dimension of the standing-water-length 137, preferably at least fifty percent of the standing-water-length should lie within the treatment-pipe 29 itself. Preferably, the treatment-pipe accounts for three-quarters of the standing-water-length.

It is repeated that the treatment-pipe is the long/narrow portion of the apparatus, over which the standing-body-width is less than one quarter of the standing-body-length. Up to half of the total volume of the minimum-standing-body of water may be contained elsewhere than in the treatment-pipe, where the long/narrow limitation does not apply.

The inlet chamber preferably is deeper than the outlet chamber (and than the middle chamber), because it is the inlet chamber that collects most of the settled-out solid sludge. However, if the lie of the land is especially difficult, it may be easier to excavate a deeper hole for the outlet-chamber or for the middle-chamber than for the inlet-chamber. In that case, the outlet or middle chamber may be lengthened (i.e deepened) appropriately, and the main collection of sludge would then occur in that chamber. One of the benefits of the treatment-pipe apparatus is that, if the inlet chamber is shallow, whereby its floor is quickly covered with sludge, it is unlikely that sludge will then build up actually in the treatment-pipe, due to the (periodic) movement of water in the treatment-pipe. Of course, when the inlet chamber is shallow, the prudent owner will monitor the apparatus more closely, to make sure the treatment-pipe is not starting to become blocked with sludge.

The designer should prefer the inlet and outlet chambers to be small, to minimise the amount of extra excavation (i.e extra to the trench that will house the treatment-pipe). The main benefit of the invention comes from the presence of the treatment-pipe, rather than from the presence of the inlet and outlet chambers. One, or both, chambers, as separately-manufactured structures, may be omitted. Again, the water contained in the chambers should not comprise more than half the total volume of the whole minimum-standing-body.

The treatment-pipe 129 preferably is a length of extruded round plastic pipe. However, other forms are contemplated, and, as mentioned, in the broad sense the treatment structure should be referred to rather as a treatment-trough, than a treatment-pipe. The treatment-trough must be watertight, as to its bottom and sides, but there is no need for the treatment-trough to be watertight as to its roof. The trough roof is there mainly for physical protection—to prevent objects falling into the water. The treatment-trough may be structured as a fabrication, in which the roof is separate from the floor and sides of the trough.

On the other hand, the convenience is preferred, of containing the water in an actual physical pipe, with its constant-thickness cylindrical walls, and inexpensive, easily available, but assured, integrity.

When the treatment-pipe is long, it may be in sections. The sections may be joined by such means as bolted-together flanges, or an enlarged end on one of the sections which slides over the plain end of the adjacent section, etc.

The treatment apparatus may be arranged with more than one treatment-pipe. When two or more treatment-pipes are used, they may be arranged in series. An example of an apparatus with two pipes in series, where the two pipes lie both at the same level, is shown in FIG. 13.

Putting two pipes in series can be done where, for example, the lie of the land dictates a major change of direction. In FIG. 13, a middle chamber 149 is provided, between the first and second pipes. While this middle chamber can be of some use for collecting settled-out solids, its main purpose is simply to provide a physical structure into which the ends of the treatment-pipes can be mounted and sealed.

An example of an apparatus with two pipes in series, where the two pipes lie at different levels, is shown in FIG. 14. The water level in the second pipe is lower than that in the first pipe, due to the presence of the weir 150 in the middle chamber 152. Thus, the minimum-standing-body of water need not be in one coherently-unitary body, having all the same surface level. However, a change in level might give rise to some aeration of the water, which might affect the efficiency of the anaerobic reactions, so preferably the minimum-standing-body should be a coherent, unitary body of water, unless that is impossible due to the lie of the land.

An example of an apparatus with two treatment-pipes in parallel is shown in FIG. 15. This can be done, again, when the ground is very difficult, and deep excavation must be kept to a minimum. Both pipes use a common inlet chamber 153 and a common outlet chamber 154. Where two (or more) pipes are used, the designer preferably should arrange the inlet and outlet chambers such that neither one of the pipes receives more flow than the others. Thus, it would not be preferred, in the second aspect of the invention, to provide two or more treatment-pipes, where the pipes were substantially different as to size, flow-rate, etc. The designer preferably should see to it that the residence time of the water is the same, whichever treatment-pipe the water passes through.

In the parallel treatment-pipes version, the parallel-pipes should be fed from a common entry-chamber. The parallel-pipes need not all drain into a common outlet chamber; however, it should be noted that if the parallel pipes have separate outlet ports, the water in all the pipes will drain down to the level of the lowest port; thus, a common outlet chamber, with one single outlet pipe, is also preferred.

It should be noted that the treatment apparatus as described herein, regarding the second aspect of the invention, is intended only for promoting the anaerobic digestion reactions. After having paused through the anaerobic treatment stage, in the treatment-pipe, the water has to be aerated, to promote the needed aerobic treatment reactions. The aerobic treatment station is not included in the second aspect of the invention, and the treatment-pipe, as described in the second aspect of the invention, cannot, by definition, be a part of the aerobic treatment station.

In a case where the treatment apparatus has to accommodate a greater dose rate of incoming sewage, the treatment-pipe length may be increased. But there is no need to increase the other dimensions of the apparatus. Thus, capacity may be increased, up to a dose-rate of around 15,000 liters per day, simply by increasing the length of the 45 cm diameter pipe, for instance to twenty meters. In respect of the minimum-standing-body of water, the designer should aim for four-to-one, or greater, in respect of the ratio of the standing-body-length to the standing-body-width, at more than half the points along the standing-body-length.

Below four-to-one, the septic treatment-trough does not have the required long/narrow configuration; rather, it would now be characterised as a short/wide container, like a traditional septic tank; and as such it would be prone to the channelling of unwanted pathways. Also, the short/wide container does not have the mechanical structural integrity of a long/narrow trough or pipe. Although four-to-one is the limit, about six-to-one should be regarded as the working limit, to be used in practice, as giving a reasonable commercial margin of tolerance. Above about eight-to-one, diminishing returns can be expected, i.e the freedom from unwanted channelling is almost completely assured at about eight-to-one. If more volume is required, tough, it is preferred to add volume by way of extra length, rather than extra width, though the designer should take care that the water does not travel along the treatment-pipe at too high a velocity.

As described, the invention is particularly applicable for use in domestic installations, either for one house, of for a small number of houses that share wastewater treatment, or for small institutional installations, having a dose rate up to about 15,000 liters per day. In these installations, the septic treatment is followed by the usual aerobic treatment, and then the water is infiltrated into the ground, at or close to the treatment station(s). The water is not piped away (or not piped for any great distance), either before or after passing through the anaerobic and aerobic treatment station(s). In these cases, apart from the plumbing pipes in the house, the treatment-pipe itself comprises almost the only length of pipe in the system. However, it is not a limitation of the invention that the water not be piped away.

For a one-bedroom house (750 liters per day), a five or six meter run of 45-cm pipe (with suitable end-chambers) would be suitable; so would two five or six meter runs of 30-cm pipe. For a four-bedroom house (2,500 liters per day) nine or ten meters of 60-cm pipe, plus end-chambers, would be suitable.

The invention is not so applicable to large installations, e.g installations that cater for dozens of domestic homes, or for larger public institutions, or municipal water treatment installations, because there, usually, the savings arising from the minimal excavations, and from the easy assurance of mechanical stability, would be less. This is not to say that the invention must be ruled out in respect of large installations, and indeed especially the parallel-pipe configuration of FIG. 15 can lend itself well to large installations. But rather, the invention especially lends itself to the type of housing development where each house has its own individual water treatment station, or each set of four or five houses.

Notionally, the dimensions of the apparatus could be reduced, if the dosing were less than 1000 liters per day; but in practice, treatment systems are hardly ever designed for dosing rates of less than 1000 liters per day.

If the desired average residence time for water passing through the system were one day, the minimum standing volume should be equal to one day's dosage. But the average residence time should not be net as low as one day, since that would leave too small a margin for variations. Rather, the designer should provide that the minimum-standing-body of water has a volume of preferably one-and-a-half times, and a minimum of one-and-a-quarter times, the average daily dose rate. Thus, where the dose rate is 3,000 liters per day, the volume of the minimum-standing-body preferably should be 4,500 liters. As mentioned, keeping the width and depth of the minimum-standing-body below one quarter of the standing-body-length, over at least half of the standing-body-length, enables freedom from unwanted pathways. A treatment-pipe less than one meter diameter is suitable for installations dealing with up to about 15,000 liters per day, in that differences in residence time can be accommodated by using different lengths of treatment pipe.

However, for installations that deal with more than about 15,000 liters per day, the diameter of the treatment pipe should be increased beyond the one meter, because at that large flow rate, a one-meter pipe would be too narrow, in that the water would be flowing along the pipe at too high a velocity. Therefore, for large flow rates, the diameter of the pipe should be increased to a dimension that enables the water, again, to move only very slowly.

As mentioned, the apparatus should be engineered such that the volume of the minimum-standing body is $1\frac{1}{4}$ to $1\frac{1}{2}$ times the average daily dosing rate. If the designer specifies a smaller volume than that, there may not be enough margin to cater for the inevitable variations in usage. If the designer specifies a greater volume, the system may be utilising the available space in an inefficient manner. It may be noted that the cost of returning later to increase the capacity of a too-small treatment-pipe system is considerably less than the cost of returning later to increase the capacity of a too-small concrete tank system. So, with a concrete tank, the prudent designer makes sure to over-engineer the system; but with the treatment-pipe, the designer can leave less of a margin.

It should be understood that the treatment-pipe of the invention is a deliberately engineered containment structure. It might be considered that, sometimes, a treatment-pipe system, like that described herein, might have arisen accidentally, for example when a sewage pipe became (partially) blocked, causing water to be backed up, and the backed-up pool of water might correspond to the minimum-standing-body of water. Indeed, the water in such a pool might undergo some anaerobic treatment. The treatment-pipe (or treatment-trough) of the invention lies in the engineered structure that sets the minimum-standing-body of water, as described; the invention does not lie in the body of water itself.

Where the wastewater is fairly clear of suspended solids, for instance where the treatment-pipe station receives water that has passed through a pre-treatment station, the treatment-pipe can contain a filter medium. The purpose of the filter medium is to encourage attached microbial growth and to enhance treatment. The medium should have good permeability and porosity, while maximizing surface area. A mat of thin plastic strips, for example, is very suitable. Preferably, the medium should be removable from one end of the treatment-pipe, for occasional servicing. The medium must be made from a non-biodegradable material that will attract microbes, such as polyethylene, polyurethane, rock wool; but not material that will absorb water and weaken, like nylon; nor repel microbes, like styrene-type.

In connection with the septic treatment-pipe, an alternative to placing the treatment pipe in a predominantly horizontal configuration, as depicted herein, is to align the treatment pipe vertically, or nearly vertically. The treatment-pipe can be in two sections, one conveying the water downwards, followed by another which conveys the water back up. This arrangement can be made to perform efficiently, and be economical, if the lie of the land requires it.

In a preferred option wastewater is treated first in a septic treatment pipe, as described herein, and then passes to a second treatment pipe, containing the described treatment material. Thus the wastewater is treated both anaerobically and aerobically in the respective treatment pipes.

What is claimed is:

1. Apparatus for treating wastewater, wherein:

the apparatus includes a container, having an inlet port for receiving wastewater to be treated and an outlet port;

the container has left and right side-walls and a floor;

the left and right side-walls of the container have respective inwards-facing surfaces, which define a hollow interior of the container, between which the wastewater is contained;

the container includes a treatment-trough, which is of a long/narrow configuration;

the treatment-trough is a component of the container, and is so arranged that wastewater, in passing from the inlet port to the outlet port of the container, passes along and through the treatment-trough;

portions of the left and right side-walls of the container lie in the treatment-trough, and comprise left and right trough-side-walls;

the trough-side-walls confine the water being treated in the treatment-trough, and the apparatus is so configured that water, having once entered the treatment-trough, is constrained, by the trough-side-walls, to pass lengthwise along the treatment-trough, and to remain between the trough-side-walls, to the outlet port;

a portion of the floor of the container lies in the treatment-trough, and comprises the trough-floor;

in a cross-section taken longitudinally along the treatment-trough, being a cross-section taken at the full depth of the trough-floor, a longitudinal-trough-floor-line is the longitudinal line that most closely follows the trough-floor, in that cross-section;

an inlet-point and an outlet-point are points that lie within the container, and are the points on the longitudinal-trough-floor-line, or on extensions of the longitudinal-trough-floor-line, which are closest, respectively, to the inlet port and the outlet port of the container;

the length of the longitudinal-trough-floor-line between the inlet-point and the outlet-point is termed the container-length;

at each point along the container, the container has a respective container-width, being the width between the container-side-walls at that point;

at least some of the points along the length of the container comprise also points-T of the treatment-trough, being those points in respect of which the container-width at the point is less than ¼ of the container-length;

the treatment-trough comprises the aggregate of all the points-T;

the apparatus includes a body of treatment material, which:—

(a) is porous and permeable to the passage of water therethrough, and is capable of supporting vigorous microbe colonies;

(b) resides in the treatment-trough, and makes tight contact with the trough-floor, and makes tight contact with at least a bottom portion of the trough-side-walls, in such manner as to ensure that water, in passing through the treatment-trough, cannot by-pass the treatment material;

wastewater being treated in the apparatus moves along respective paths, in passing from inlet to outlet, through the body of treatment-material;

in respect of each of the respective paths, the water traverses through, and in contact with, the treatment-material, for respective treatment-lengths, being the longitudinally-projected total length of the contact of the water with the treatment-material;

the shortest one of the treatment-lengths is at least two meters in length, whereby a drop of water, in passing from inlet port to outlet port of the container, traverses a longitudinal distance, in contact with the body of treatment-material, of at least two meters;

the wastewater is water contaminated with carbonaceous BOD, and the arrangement of the apparatus is such:

that the body of treatment material does not completely fill the treatment-trough, but an air-passage exists, running above the body of treatment material in the trough, and so arranged that water residing in the pores of the treatment material is exposed to air in the air-passage;

that the air-passage is sufficiently open to the atmosphere as to enable substantial aerobic microbiological breakdown reactions of the BOD in the water residing in the pores of the treatment material.

2. Apparatus of claim 1, wherein the floor of the trough is predominantly horizontal;

and in the said cross-section taken longitudinally along the treatment-trough, being a cross-section taken lengthwise at the full depth of the trough-floor, the longitudinal-trough-floor-line, being the line that most closely follows the trough-floor, is horizontal.

3. Apparatus of claim 1, wherein:

a point along the length of the container comprises a point-T of the treatment-trough only if the container-width at the point, being less than ¼ of the container-length, also is less than about 100 cm;

the container is characterised in that any and every point along the length of the container in respect of which the container-width at that point is greater than ¼ of the container-length, is not a point-T of the treatment-trough.

4. Apparatus of claim 1, wherein:

the said treatment-trough is the only treatment-trough included in the container, in that the container is so arranged that there is no pathway that wastewater, having entered through the inlet port, could take, which does not pass through the one said treatment-trough;

and the shortest one of the treatment-lengths of the one single treatment-trough is at least three meters.

5. Apparatus of claim 1, wherein the container includes two or more treatment-troughs, arranged in series, so that the wastewater passes from one to another.

6. Apparatus of claim 1, wherein the wastewater comprises sewage-water from a human habitation.

7. Apparatus for treating wastewater, wherein:

the apparatus includes a treatment trough, having an entry port for receiving water to be treated, and an exit port;

the trough has left and right trough-side-walls, and a trough-floor;

the trough-side-walls and trough-floor confine the water being treated, and constrain the water, having been received in the entry port, to pass longitudinally along the trough to the exit port;

the apparatus includes a body of treatment material, which:—
   (a) is porous and permeable to the passage of water therethrough, and is capable of supporting vigorous microbe colonies;
   (b) fits in the trough, between the left and right trough-side-walls, and rests in contact with the trough-floor;

the structure and arrangement of the apparatus is such that:—
   water undergoing treatment occupies the pores of the treatment material;
   a trough-length of the trough comprises the shortest length of the trough-floor, as measured on a line from the entry port to the exit port, that is both (a) wetted by the water being treated, and (b) in contact with the treatment material;
   at points along the trough-length, the left and right trough-side-walls serves to confine the water undergoing treatment within the treatment-material to respective trough-widths, each respective trough-width being the distance apart of the trough-side-walls at the respective point;
   the trough is of a long/narrow configuration, in that the ratio of the trough-length to the trough-width is 3:1 or more, over at least eighty percent of the trough-length;

the wastewater is water contaminated with carbonaceous BOD, and the arrangement of the apparatus is such:
   that the body of treatment material does not completely fill the treatment trough, but an air-passage exists, running above the body of treatment material in the trough, and so arranged that water residing in the pores of the treatment material is exposed to air in the air-passage;
   that the air-passage is sufficiently open to the atmosphere as to enable substantial aerobic microbiological breakdown reactions of the BOD in the water residing in the pores of the treatment material.

8. Apparatus of claim 7, wherein the structure and arrangement of the apparatus is such that the line, on the trough-floor, comprising the trough-length is at least approximately horizontal over at least eighty percent of its length.

9. Apparatus of claim 8, wherein:
   the trough is long, in that a drop of water, in passing from entry to exit, along the trough-length, traverses a horizontal distance, through the treatment material, of at least two meters; and
   the trough is narrow, in that the trough-width is less than about 100 cm, over at least eighty percent of the trough-length; and
   the trough is of a long/narrow configuration, in that the ratio of the trough-length to the trough-width is 5:1 or more, over at least eighty percent of the trough-length.

10. Apparatus of claim 7, wherein the apparatus includes an entry-chamber, which is so arranged that water entering the trough passes first Into the entry-chamber before passing into the entry-port of the trough.

11. Apparatus of claim 7, wherein:
   the apparatus includes a plurality of water-treatment sub-troughs, of which the said trough comprises one;
   the sub-troughs have respective sub-sides and sub-floors, and respective entry ports and exits ports, and respective sub-trough-lengths, being the respective distances between the entry ports and exit ports;
   the apparatus includes a single inlet-pipe, through which all water to be treated by the apparatus is received into the apparatus;
   the apparatus includes an entry-chamber, common to all the sub-troughs, which is so arranged that water entering the inlet-pipe passes into and through the entry-chamber before passing into the entry-ports of the sub-troughs;
   the sub-troughs are arranged to conduct water away from the common entry-chamber;
   the apparatus includes a plurality of sub-bodies of treatment material, disposed respectively one to each sub-trough, of which the said body of treatment material comprises one;
   each sub-body of treatment material, in its respective sub-trough:—
      (a) is porous and permeable to the passage of water therethrough, and is capable of supporting vigorous microbe colonies;
      (b) fits in the sub-trough, between the left and right sub-sides, and rests in contact with the sub-floor;
   the structure and arrangement of each sub-trough is such that:—
      a sub-trough-length of the sub-trough is the shortest length of the sub-floor, as measured on a line from the entry port to the exit port, that is both (a) wetted by the water being treated, and (b) in contact with the sub-body of treatment material;
      water undergoing treatment, upon being received at the entry port of the sub-trough, travels longitudinally along the sub-trough to the exit port of the sub-trough;
   at points along the sub-trough-length, the structure of the sub-trough serves to confine the water undergoing treatment to respective sub-trough-widths;
   the sub-trough is of a long/narrow configuration, in that the ratio of the sub-trough-length to the sub-trough-width is 3:1 or more, over at least eighty percent of the sub-trough-length.

12. Apparatus of claim 11, wherein, in respect of each of the sub-troughs:
   the sub-trough is long, in that the sub-trough-length is at least two meters;
   the sub-trough is narrow, in that the structure of the sides and floor of the sub-trough is such as to confine the sub-trough-width, to less than about 50 cm, over at least eighty percent of the sub-trough-length.

13. Apparatus of claim 11, wherein the arrangement of the sub-troughs is such that, between the respective entry and exit ports thereof, there is no communication whereby water could pass between adjacent sub-troughs.

14. Apparatus of claim 7, wherein the arrangement of the apparatus is such:
   as to provide an open passage along the length of the treatment material in the trough;
   that the open passage is above the body of treatment material, whereby water cannot enter the passage except on an overflow basis;
   that the air passage is continuous, and runs all along the length of the body of treatment material, and is open to the atmosphere.

15. Apparatus of claim 7, wherein the treatment material is one of:

(a) open-cell foam;
(b) rockwool (tm) spun molten silicate;
(c) sand or gravel having a measurable degree of absorbency;
(d) plastic artificial turf, and the body of treatment material comprises the turf wrapped into a spiral that is a tight fit inside the pipe.

16. Apparatus of claim 15, wherein the open cell foam has a porosity between ninety and ninety-six percent.

17. Apparatus of claim 7, combination with a source of wastewater to be treated, wherein the source produces water to be treated at the rate of D1 liters per day, and the minimum-volume is at least twenty percent of D1.

18. Apparatus of claim 7, wherein the treatment trough comprises a treatment-pipe, having a floor, sides, and a roof, of the treatment-pipe, forming a complete circumferential enclosure, and being of constant cross-section along its length.

19. Apparatus of claim 7, wherein the treatment material is of an absorbent nature, having a capacity for holding a minimum-volume of water therein by capillary action, whereby the trough, during water treatment, contains never less than the said minimum-volume of water.

20. Apparatus of claim 19, wherein the apparatus is arranged so that the body of treatment material is free-draining, in that the exit-port is so located that, but for the absorbency and capillarity of the body of treatment material, the said minimum-volume would be zero.

21. Apparatus of claim 19, wherein the minimum-volume of water retained in the treatment material is large enough, and is retained in the treatment material for a residence time that is long enough, to provide sufficient aerobic treatment that the water passing out of the exit port is thoroughly oxidised.

22. Apparatus of claim 19, wherein:
   the sewage water arrives at the entry port, for treatment, in periodic individual dosings, the average volume per dosing being at least ten liters;
   the nature and volume of the treatment material, and its arrangement in the treatment trough, are such that the minimum-volume of wastewater retained in the treatment material between dosings is several times larger than the volume of the individual dosings.

23. Apparatus of claim 7, wherein the wastewater entering the entry port, for treatment in the apparatus, comprises sewage-water, being sewage-water that has passed through a septic treatment facility.

24. Apparatus of claim 23, wherein the apparatus is so sized and arranged as to be suitable for treating the sewage effluent from a single domestic dwelling, or from a small number of domestic dwellings.

25. Apparatus for treating wastewater, wherein:
   the apparatus includes a treatment trough, having an entry port for receiving water to be treated, and an exit port;
   the trough has left and right trough-side-walls, and a trough-floor;
   the trough-side-walls and trough-floor confine the water being treated, and constrain the water, having been received in the entry port, to pass longitudinally along the trough to the exit port;
   the apparatus includes a body of treatment material, which:—
      (a) is porous and permeable to the passage of water therethrough, and is capable of supporting vigorous microbe colonies;
      (b) fits in the trough, between the left and right trough-side-walls, and rests in contact with the trough-floor;
   the structure and arrangement of the apparatus is such that:—
      water undergoing treatment occupies the pores of the treatment material;
      a trough-length of the trough comprises the shortest length of the trough-floor, as measured on a line from the entry port to the exit port, that is both (a) wetted by the water being treated, and (b) in contact with the treatment material;
      at points along the trough-length, the left and right trough-side-walls serves to confine the water undergoing treatment within the treatment-material to respective trough-widths, each respective trough-width being the distance apart of the trough-side-walls at the respective point;
      the trough is of a long/narrow configuration, in that the ratio of the trough-length to the trough-width is 3:1 or more, over at least eighty percent of the trough-length;
   the apparatus includes a plurality of water-treatment sub-troughs, of which the said trough comprises one;
   the sub-troughs have respective sub-sides and sub-floors, and respective entry ports and exits ports, and respective sub-trough-lengths, being the respective distances between the entry ports and exit ports;
   the apparatus includes a single inlet-pipe, through which all water to be treated by the apparatus is received into the apparatus;
   the apparatus includes an entry-chamber, common to all the sub-troughs, which is so arranged that water entering the inlet-pipe passes into and through the entry-chamber before passing into the entry-ports of the sub-troughs;
   the sub-troughs are arranged to conduct water away from the common entry-chamber;
   the apparatus includes a plurality of sub-bodies of treatment material, disposed respectively one to each sub-trough, of which the said body of treatment material comprises one:
   each sub-body or treatment material, in its respective sub-trough:—
      (a) is porous and permeable to the passage of water therethrough, and is capable of supporting vigorous microbe colonies;
      (b) fits in the sub-trough, between the left and right sub-sides, and rests in contact with the sub-floor;
   the structure and arrangement of each sub-trough is such that:—
      a sub-trough-length of the sub-trough is the shortest length of the sub-floor, as measured on a line from the entry port to the exit port, that is both (a) wetted by the water being treated, and (b) in contact with the sub-body of treatment material;
      water undergoing treatment, upon being received at the entry port of the sub-trough, travels longitudinally along the sub-trough to the exit port of the sub-trough;
      at points along the sub-trough-length, the structure of the sub-trough serves to confine the water undergoing treatment to respective sub-trough-widths;
      the sub-trough is of a long/narrow configuration, in that the ratio of the sub-trough-length to the sub-trough-width is 3:1 or more, over at least eighty percent of the sub-trough-length;
      and the sub-troughs are formed as components of a corrugated sheet of impermeable material, and the corrugations form the sub-troughs.

26. Apparatus for treating wastewater, wherein:
the apparatus includes a treatment trough, having an entry port for receiving water to be treated, and an exit port;
the trough has left and right trough-side-walls, and a trough-floor;
the trough-side-walls and trough-floor confine the water being treated, and constrain the water, having been received in the entry port, to pass longitudinally along the trough to the exit port;
the apparatus includes a body of treatment material, which:—
(a) is porous and permeable to the passage of water therethrough, and is capable of supporting vigorous microbe colonies;
(b) fits in the trough, between the left and right trough-side-walls, and rests in contact with the trough-floor;
the structure and arrangement of the apparatus is such that:—
water undergoing treatment occupies the pores of the treatment material;
a trough-length of the trough comprises the shortest length of the trough-floor, as measured on a line from the entry port to the exit port, that is both (a) wetted by the water being treated, and (b) in contact with the treatment material;
at points along the trough-length, the left and right trough-side-walls serves to confine the water undergoing treatment within the treatment-material to respective trough-widths, each respective trough-width being the distance apart of the trough-side-walls at the respective point;
the trough is of a long/narrow configuration, in that the ratio of the trough-length to the trough-width is 3:1 or more, over at least eighty percent of the trough-length;
the apparatus includes structure for maintaining water in the trough at a volume at or above a minimum-volume, whereby the trough, during water treatment, contains never less than the said minimum-volume of water;
the treatment material is of an absorbent nature, having a capacity for holding water by capillary action;
the body of treatment material is so disposed in the trough that the minimum-volume resides in three water-layers of the body of the treatment material, being:
a saturated-layer, in which the pores are full of water;
a wet-layer, in which the pores are more than half full of water;
and a moist-layer in which the pores contain water but are less than half full;
the trough-floor and trough-sides confine the water-layers to a width over all of less than 100 cm;
the minimum-volume is the aggregate of all water that is present in all three of the water-layers;
the apparatus is so arranged that the body of treatment material also includes a dry-layer, in which the pores contain no water, and which surmounts the moist-layer.

27. Apparatus of claim 26, wherein the exit-port is at floor level.

28. Apparatus of claim 26, wherein:
the exit-port is so structured as to provide a weir, which defines a weir-level, whereby a below-weir level of water upstream of the exit-port, and below the weir-level, is retained in the trough;
the absorbency and capillarity of the body of treatment material provide that an above-weir portion of the saturated-layer resides in the body of treatment material, above the weir-level;
the below-weir portion of the body is included in the saturated-layer;
the remainder of the body of treatment material lies above the weir-level, and includes the wet-layer, the moist-layer, and the dry-layer.

29. Apparatus of claim 26, wherein the body of treatment material is so dimensioned and configured, in relation to the floor and sides of the trough, that a drop of water, in passing along the shortest pathway a drop of water could take through any of the saturated, wet, and moist layers, permeates through at least two meters of treatment material.

30. Apparatus of claim 26, wherein the trough-side-walls confine and guide the flow of water along the trough, and are impermeable, and sealed, to the extent that water, once having entered the entry port of the trough, cannot pass outside the trough, except through the exit port thereof.

31. Apparatus of claim 7, wherein the trough floor is all on one level, and is at least approximately horizontal.

32. Apparatus for treating wastewater, wherein:
the apparatus includes a treatment trough, having an entry port for receiving water to be treated, and an exit port;
the trough has left and right trough-side-walls, and a trough-floor;
the trough-side-walls and trough-floor confine the water being treated, and constrain the water, having been received in the entry port, to pass longitudinally along the trough to the exit port;
the apparatus includes a body of treatment material, which:—
(a) is porous and permeable to the passage of water therethrough, and is capable of supporting vigorous microbe colonies;
(b) fits in the trough, between the left and right trough-side-walls, and rests in contact with the trough-floor;
the structure and arrangement of the apparatus is such that:—
water undergoing treatment occupies the pores of the treatment material;
a trough-length of the trough comprises the shortest length of the trough-floor, as measured on a line from the entry port to the exit port, that is both (a) wetted by the water being treated, and (b) in contact with the treatment material;
at points along the trough-length, the left and right trough-side-walls serve to confine the water undergoing treatment within the treatment-material to respective trough-widths, each respective trough-width being the distance apart of the trough-side-walls at the respective point;
the trough is of a long/narrow configuration, in that the ratio of the trough-length to the trough-width is 3:1 or more, over at least eighty percent of the trough-length;
the trough floor is on two levels, both of which are approximately horizontal, and which are separated by an intermediate weir.

33. Apparatus for treating wastewater, wherein:
the apparatus includes a treatment trough, having an entry port for receiving water to be treated, and an exit port;
the trough has left and right trough-side-walls, and a trough-floor;
the trough-side-walls and trough-floor confine the water being treated, and constrain the water, having been received in the entry port, to pass longitudinally along the trough to the exit port;

the apparatus includes a body of treatment material, which:—
(a) is porous and permeable to the passage of water therethrough, and is capable of supporting vigorous microbe colonies;
(b) fits in the trough, between the left and right trough-side-walls, and rests in contact with the trough-floor;

the structure and arrangement of the apparatus is such that:— water undergoing treatment occupies the cores of the treatment material;

a trough-length of the trough comprises the shortest length of the trough-floor, as measured on a line from the entry port to the exit port, that is both (a) wetted by the water being treated, and (b) in contact with the treatment material;

at points along the trough-length, the left and right trough-side-walls serves to confine the water undergoing treatment within the treatment-material to respective trough-widths, each respective trough-width being the distance apart of the trough-side-walls at the respective point;

the trough is of a long/narrow configuration, in that the ratio of the trough-length to the trough-width is 3:1 or more, over at least eighty percent of the trough-length;

the treatment trough comprises a treatment-pipe, having a floor, sides, and a roof, of the treatment-pipe, forming a complete circumferential enclosure, and being of constant cross-section along its length;

the body of treatment material is a resilient body of open-cell foam;

the body of foam is formed with a cross-sectional configuration complementary to that of the pipe, and of such dimensions as to be a tight fit inside the pipe;

except that an upper sector of the body of foam is formed with a cut-out, which comprises an air-passage.

34. Apparatus of claim 33, in combination with a source of wastewater to be treated, wherein:

the pipe is right cylindrical, and is not more than 30 cm diameter;

the source produces water to be treated at a rate of T1 liters per day, where T1 is less than 500 liters;

and the length of the pipe, as measured in centimeters, is between ½ and 2 times T1.

35. Apparatus of claim 33, in combination with a source of wastewater to be treated, wherein:

the pipe is right cylindrical, and is not more than 50 cm diameter;

the source produces water to be treated at a rate of T2 liters per day, where T2 is between 500 and 1000 liters;

the length of the pipe, as measured in centimeters, is between ½ and 1 times T2.

36. Apparatus of claim 33, in combination with a source of wastewater to be treated, wherein:

the pipe is right cylindrical, and is not more than 100 cm diameter;

the source produces water to be treated at a rate of T3 liters per day, where T3 is between 1000 and 2000 liters;

the length of the pipe, as measured in centimeters, is between ⅛ and ½ times T3.

37. Apparatus of claim 33, wherein:

the apparatus includes two treatment pipes, arranged in series;

each of the two treatment pipes forms a complete circumferential enclosure and is of constant cross-section along its length.

38. A container for treating wastewater, wherein:

the container includes an inlet port for receiving wastewater to be treated, and an outlet port;

the arrangement of the container is such that, when water enters the inlet port, the level of water in the container tends to rise, thereby causing excess water to flow out from the outlet port;

the container is so arranged that water drains out of the outlet port, down to a minimum-standing-body of water which is retained in the container;

the minimum-standing-body of water has a standing-inlet-point and a standing-outlet-point, which are the closest points on the surface of the minimum-standing-body of water to the inlet port and the outlet port respectively;

the minimum-standing-body of water has a standing-water-length, which is the length of the shortest line through the minimum-standing-body, between the standing-inlet-point and the standing-outlet-point;

the container includes left and right side-walls;

the left and right side-walls have respective inwards-facing surfaces and outwards-facing-surfaces;

the inwards-facing-surfaces define a hollow interior of the container, in which the minimum-standing-body of water is contained, and which are in direct wetted contact with the minimum-standing-body of water;

at each point-P along the standing-water-length of water in the container, the container has a respective standing-water-width-P associated therewith;

the standing-water-width-P is the width overall of the minimum-standing-body of water at the point-P, as measured between the inwards-facing side-surfaces of the left and right side-walls of the container at point-P;

the container includes a treatment-trough, which is of a long/narrow configuration;

the treatment-trough is a component of the container, and is so arranged that wastewater, in passing from the inlet port to the outlet port of the container, passes along and through the treatment-trough;

each point-P along the standing-water-length comprises also a point-T of the standing-water-length if:—
(a) the standing-water-width-P at that point is less than about 120 cm; and
(b) the standing-water-width-P at that point is less than about ¼ the standing-water-length;

the treatment-trough comprises the aggregate of all the points-T of the container;

the line of the standing-water-length passes through the treatment-trough, and the treatment-trough has a trough-length, which is the length of that portion of the line of the standing-water-length that lies within the treatment-trough;

the trough-length is at least two meters;

portions of the left and right side-walls of the container that lie in the treatment-trough comprise left and right trough-side-walls, having respective inwards-facing and outwards-facing side surfaces;

the treatment-trough is structurally isolated, in that:—

(a) no portion of the left and right trough-side-walls is wetted on both side-surfaces thereof by the minimum-standing-body of water; and (b) all points on the outwards-facing side-surfaces of the left and right trough-side-walls lie wholly outside the treatment-trough, in that all the said points on the outwards-facing side-surfaces are not wetted by the minimum-standing-body of water;

the wastewater entering the minimum-standing-body comprises sewage;

the arrangement of the container is such that wastewater entering the minimum-standing-body undergoes anaerobic treatment reactions, and remains in the container long enough that the water exiting from the outlet port has undergone substantially complete septic treatment;

the structure of the container is such that the wastewater, in passing from the inlet point to the outlet point, has substantially no opportunity to become aerated.

39. Container of claim 38, wherein the minimum-standing-body of water retained in the container has a volume of at least about 1200 liters.

40. Container of claim 38, wherein the treatment-trough is structurally isolated, in that:— the trough-side-walls comprise a sheet of impermeable material;

the inwards-facing side-surface and the outwards-facing side-surface comprise opposed surfaces of the sheet of material, and the sheet of material is solid as to its thickness between the two surfaces;

all the points on the inwards-facing side-surface that are wetted by the minimum-standing-body are designated respectively points P1,P2, . . . , PN;

in respect of all the points P1,P2, . . . , PN on the inwards-facing side-surface, the sheet of material has a respective thickness T1,T2, . . . , TN mm;

all the points P1,P2, . . . , PN on the inwards-facing side-surface correspond to respective points Q1,Q2, . . . , QN which lie on the outwards-facing side-surface of the trough-side-wall, the points P1,P2, . . . , PN being spaced respectively T1,T2, . . . , TN mm from the points Q1,Q2, . . . , QN;

all points Q1,Q2, . . . , QN on the outwards-facing side-surface of the trough-side-wall lie wholly outside the treatment-trough, in that all the said points Q1,Q2, . . ., QN are not wetted by the minimum-standing-body of water in the treatment-trough.

41. Container of claim 38, wherein the treatment-trough also includes a floor and a roof, which make the treatment-trough circumferentially complete, having respective inwards-facing and outwards-facing surfaces, and all the points on the outwards-facing surfaces of the floor and roof lie wholly outside the treatment-trough, in that all the said points are not wetted by the minimum-standing-body of water in the treatment-trough.

42. Container of claim 38, wherein the line comprising the standing-surface-length is continuous and uninterrupted, between the standing-inlet-point and the standing-outlet-point.

43. Container of claim 42, wherein:

the container includes only one treatment-trough, in that the container is so arranged that there is no pathway that wastewater, having entered through the inlet port, could take, which does not pass through the said treatment-trough;

the surface of the minimum-standing-body of water is continuous and all at a single level, between the inlet port and the outlet port;

the trough-length of the one treatment-trough is at least four meters.

44. Container of claim 38, wherein:

the treatment-trough comprises two series-troughs, arranged in series;

the surface of the minimum-standing-body of water is on two levels respectively in the series-troughs;

and the apparatus includes means for transferring water between the levels.

45. Container of claim 44, wherein the means for transferring water between the levels is one of (a) a gravity-weir, or (b) an electric pump.

46. Container of claim 38, wherein:

the standing-water-length is not more than the trough-length plus three meters; or the standing-water-length is not more than one-and-a-half times the trough-length-TL.

47. Container of claim 38, wherein, at each point-T along the trough-length, the minimum-standing-body of water at that point has a respective standing-water-depth-T, which is less than about ¼ the standing-water-length.

48. Container of claim 38, wherein each point-P along the standing-water-length comprises also a point-T of the standing-water-length only if the standing-water-width-P at that point is less than about 100 cm.

49. Container of claim 48, wherein each point-P along the standing-water-length comprises also a point-T of the standing-water-length only if the standing-water-width-P at that point is less than about 70 cm.

50. Container of claim 38, wherein each point-P along the standing-water-length comprises also a point-T of the standing-water-length only if the standing-water-width-P at that point is less than about ⅙ the standing-water-length.

51. Container of claim 50, wherein each point-P along the standing-water-length comprises also a point-T of the standing-water-length only if the standing-water-width-P at that point is less than about ⅛ the standing-water-length.

52. Container of claim 38, wherein, once it has entered the treatment-trough, the water is confined by the trough-side-walls, and continues to the end of the trough.

53. Container of claim 38, wherein:

the treatment-trough comprises a treatment-pipe, having pipe-side-walls;

the left and right trough-side-walls comprise the pipe-side-walls of the treatment pipe;

the treatment-pipe is circumferentially continuous, and has the same cross-sectional size and configuration, at all points along its length;

the treatment-pipe is structurally isolated, in that:
  no portion of the pipe-side-walls is wetted on both side-surfaces thereof by the minimum-standing-body of water;
  all points on the outwards-facing side-surfaces of the pipe-side-walls lie wholly outside the treatment-pipe, in that all the said points on the outwards-facing side-surfaces are not wetted by the minimum-standing-body of water.

54. Container of claim 53, wherein the treatment-pipe is right-cylindrical.

55. Container of claim 53, wherein the inwards-facing surfaces of the pipe-side-walls are smooth and uninterrupted lengthwise of the treatment-trough, whereby substantially no pockets of water can collect, and be retained.

56. Container of claim 53, wherein:
   the container includes an inlet chamber, which contains the inlet-port;
   the treatment-pipe is sealingly attached to the inlet chamber, and is in liquid-transfer-communication therewith.

57. Container of claim 56, wherein the inlet chamber includes a deposition-sump, which is so arranged, as to its depth and location in the inlet chamber, that a portion of the water comprising the minimum-standing-body and residing in the inlet chamber remains still enough to enable sediment present In the water to settle out into the deposition-sump.

58. Container of claim 53, wherein:
   the container includes an outlet chamber, and the outlet chamber contains the outlet-port;
   the treatment-pipe is sealingly attached to the outlet-chamber, and is in liquid-transfer-communication therewith.

59. Container of claim 53, wherein the treatment-troughs comprise two treatment-pipes, and the container includes a middle chamber, sealingly connected between the two treatment-pipes.

60. Container of claim 38, wherein the treatment-pipe includes a body of a filter medium, which is so structured as to promote the attachment of microbes thereto.

61. Container of claim 38, wherein:
   the arrangement of the container is such that the wastewater remains in the container, on an average flow basis, for at least half a day.

62. The combination of a container of claim 61 with a dwelling having N bedrooms, wherein the volume of the minimum-standing-body of water retained in the container is N times 500 liters.

63. Apparatus of claim 38, wherein the wastewater comprises sewage-water from a human habitation.

64. Apparatus of claim 63, wherein the apparatus is so sized and arranged as to be suitable for treating the sewage effluent from a single domestic dwelling, or from a small number of domestic dwellings.

65. Container for treating wastewater, wherein:
   the container includes an inlet port for receiving wastewater to be treated, and an outlet port;
   the arrangement of the container is such that, when water enters the inlet port, the level of water in the container tends to rise, thereby causing excess water to flow out from the outlet port;
   the container is so arranged that water drains out of the outlet port, down to a minimum-standing-body of water which is retained in the container;
   the minimum-standing-body of water has a standing-inlet-point and a standing-outlet-point, which are the closest points on the surface of the minimum-standing-body of water to the inlet port and the outlet port respectively;
   the minimum-standing-body of water has a standing-water-length, which is the length of the shortest line through the minimum-standing-body, between the standing-inlet-point and the standing-outlet-point;
   the container includes left and right side-walls;
   the left and right side-walls have respective inwards-facing surfaces and outwards-facing-surfaces;
   the inwards-facing-surfaces define a hollow interior of the container, in which the minimum-standing-body of water is contained, and which are in direct wetted contact with the minimum-standing-body of water;
   at each point-P along the standing-water-length of water in the container, the container has a respective standing-water-width-P associated therewith;
   the standing-water-width-P is the width overall of the minimum-standing-body of water at the point-P, as measured between the inwards-facing side-surfaces of the left and right side-walls of the container at point-P;
   the container includes a treatment-trough, which is of a long/narrow configuration;
   the treatment-trough is a component of the container, and is so arranged that wastewater, in passing from the inlet port to the outlet port of the container, passes along and through the treatment-trough;
   each point-P alone the standing-water-length comprises also a point-T of the standing-water-length if:—
      (a) the standing-water-width-P at that point is less than about 120 cm; and
      (b) the standing-water-width-P at that point is less than about ¼ the standing-water-length;
   the treatment-trough comprises the aggregate of all the points-T of the container;
   the line of the standing-water-length passes through the treatment-trough, and the treatment-trough has a trough-length, which is the length of that portion of the line of the standing-water-length that lies within the treatment-trough;
   the trough-length is at least two meters;
   portions of the left and right side-walls of the container that lie in the treatment-trough comprise left and right trough-side-walls, having respective inwards-facing and outwards-facing side surfaces;
   the treatment-trough is structurally isolated, in that:—
      (a) no portion of the left and right trough-side-walls is wetted on both side-surfaces thereof by the minimum-standing-body of water; and
      (b) all points on the outwards-facing side-surfaces of the left and right trough-side-walls lie wholly outside the treatment-trough, in that all the said points on the outwards-facing side-surfaces are not wetted by the minimum-standing-body of water;
   the container includes two or more parallel-troughs, of which the said treatment-trough is one;
   the container includes an entry-chamber, common to all the parallel-troughs, which is so arranged that water entering the container passes into and through the common entry-chamber before entering the parallel-troughs;
   the parallel-troughs are arranged each to conduct water away from the common entry-chamber;
   each parallel-trough has a respective parallel-standing-water-length, which is the length of the shortest line through the minimum-standing-body, between the standing-inlet-point and the standing outlet-point, and passing though the water in that parallel-trough;
   the parallel-troughs have respective parallel-trough-lengths, being those portions of the respective parallel-standing-water-lengths that lie within the respective parallel-troughs;

the parallel-troughs have respective left and right parallel-trough-side-walls;

in respect of each parallel-trough:—
   the parallel-trough-length is at least two meters;
   at each point along the parallel-trough-length, the parallel-trough has a parallel-trough-width;
   at each point along the parallel-trough-length, the parallel-trough-width is less than ¼ of the parallel-trough-length;

the arrangement of the container is such that the residence time of water in all the parallel-troughs is substantially the same.

66. Container of claim 65, wherein the container includes an exit-chamber, common to all the parallel-troughs, which is so arranged that all water emanating from all the sub-troughs passes into the common exit-chamber, and the outlet port of the container comprises the entry-mouth of a single outlet-pipe.

* * * * *